United States Patent
Goettl et al.

(10) Patent No.: US 12,435,802 B2
(45) Date of Patent: Oct. 7, 2025

(54) POOL CLEANING CONTROL SYSTEM

(71) Applicant: PUL PRODUCTS, LLC, Phoenix, AZ (US)

(72) Inventors: Steven James Goettl, Phoenix, AZ (US); Ross Anthony Dijulio, Phoenix, AZ (US)

(73) Assignee: PUL PRODUCTS, LLC, Phoenix, AZ (US)

( * ) Notice: Subject to any disclaimer, the term of this patent is extended or adjusted under 35 U.S.C. 154(b) by 3 days.

(21) Appl. No.: 18/475,951

(22) Filed: Sep. 27, 2023

(65) Prior Publication Data
US 2024/0019035 A1    Jan. 18, 2024

Related U.S. Application Data

(63) Continuation-in-part of application No. 18/448,442, filed on Aug. 11, 2023, and a continuation-in-part of
(Continued)

(51) Int. Cl.
| | |
|---|---|
| *F16K 11/072* | (2006.01) |
| *E04H 4/12* | (2006.01) |
| *F16K 15/02* | (2006.01) |

(52) U.S. Cl.
CPC .............. *F16K 11/072* (2013.01); *E04H 4/12* (2013.01); *F16K 15/025* (2013.01)

(58) Field of Classification Search
CPC ...... F16K 11/072; F16K 15/025; F16K 11/00; F16K 11/02; F16K 11/06; E04H 4/12;
(Continued)

(56) References Cited

U.S. PATENT DOCUMENTS

| | | | | |
|---|---|---|---|---|
| 2,027,360 A | | 1/1936 | Alden | |
| 3,003,514 A | * | 10/1961 | Furlong | A01G 25/162 239/66 |

(Continued)

FOREIGN PATENT DOCUMENTS

| | | |
|---|---|---|
| GB | 1006070 A | 9/1965 |
| WO | 2004097145 A1 | 11/2004 |
| WO | 2020213635 A1 | 10/2020 |

OTHER PUBLICATIONS

Webb, Scott, Save the backwash! A new invention conserves the thousands of gallons of water lost each year in a pool's sand filter backwash. If adopted, cit ould save billions, Aqua Magazine, Oct. 2020, pp. 83-88, Madison, WI, USA.

*Primary Examiner* — Jessica Cahill
(74) *Attorney, Agent, or Firm* — Kenneth C. Booth; Booth Udall, PLC

(57) ABSTRACT

A pool control system with a controller valve, a distribution valve, and a microcontroller. The controller valve has a primary water outlet and a bypass water outlet. The controller valve is configured to move between an open configuration in which the water passes from a water inlet to the primary water outlet and a closed configuration in which the water passes from the water inlet to the bypass water outlet. The distribution valve has an inlet port fluidly coupled to the primary water outlet and a plurality of outlet ports with an outlet port aperture. The outlet port aperture is configured to align with a new outlet port each time the controller valve moves from the open configuration to the closed configuration. The microcontroller is configured to discharge water from the pool control system by controlling the controller valve to change the configuration between the open and closed configurations.

20 Claims, 30 Drawing Sheets

Related U.S. Application Data application No. 18/141,810, filed on May 1, 2023, now Pat. No. 12,215,793, said application No. 18/448,442 is a continuation of application No. 17/219,856, filed on Mar. 31, 2021, now Pat. No. 11,725,742, which is a continuation-in-part of application No. 17/160,985, filed on Jan. 28, 2021, now Pat. No. 11,686,397.

(60) Provisional application No. 63/410,957, filed on Sep. 28, 2022, provisional application No. 63/410,963, filed on Sep. 28, 2022, provisional application No. 63/336,574, filed on Apr. 29, 2022.

(58) Field of Classification Search
CPC .............. E04H 4/16; Y10T 137/86863; Y10T 137/86445; Y10T 137/86509; Y10T 137/86517; Y10T 137/86533; C02F 1/005
USPC ................................ 137/624.14, 627, 625.11
See application file for complete search history.

(56) References Cited

U.S. PATENT DOCUMENTS

| | | | |
|---|---|---|---|
| 3,405,733 A * | 10/1968 | Hansen | F16K 11/074 137/627 |
| 3,524,470 A | 8/1970 | Kah, Jr. | |
| 3,642,022 A | 2/1972 | Kirby | |
| 3,827,459 A | 8/1974 | Hunter | |
| 4,298,025 A | 11/1981 | Prior | |
| 4,313,455 A | 2/1982 | Pitman | |
| 4,327,772 A * | 5/1982 | Kawabata | F16K 31/0613 137/625.48 |
| 4,522,221 A * | 6/1985 | Chivens | G01F 13/006 137/625.5 |
| 4,592,379 A * | 6/1986 | Goettl | F16K 11/10 137/627 |
| 4,817,656 A | 4/1989 | Gould | |
| 5,762,092 A * | 6/1998 | Yang | F16K 31/48 137/119.03 |
| 5,826,616 A | 10/1998 | Golden | |
| 6,189,556 B1 | 2/2001 | Blake | |
| 6,347,644 B1 | 2/2002 | Channell | |
| 6,460,564 B1 * | 10/2002 | Rief | F16K 31/5284 137/625.46 |
| 6,625,824 B1 | 9/2003 | Lutz | |
| 8,820,355 B2 | 9/2014 | Sutton | |
| 9,222,274 B1 | 12/2015 | Goettl | |
| 9,625,041 B1 | 4/2017 | Lopez | |
| 10,641,401 B1 | 5/2020 | Lopez | |
| 11,209,839 B1 * | 12/2021 | Chandler, Jr. | F16K 11/0716 |
| 2009/0199904 A1 * | 8/2009 | Babbitt | F04B 15/00 435/292.1 |
| 2011/0225717 A1 | 9/2011 | Malinasky, Jr. | |
| 2013/0248034 A1 | 9/2013 | Zhou | |
| 2013/0248457 A1 | 9/2013 | Park | |
| 2016/0238143 A1 | 8/2016 | Lopez | |
| 2017/0071443 A1 * | 3/2017 | Boyer | F16K 11/074 |
| 2019/0301636 A1 | 10/2019 | Taylor | |
| 2020/0018415 A1 | 1/2020 | Yokoe | |
| 2020/0018416 A1 | 1/2020 | Yokoe | |
| 2021/0053018 A1 * | 2/2021 | Dyer | F16K 11/074 |

* cited by examiner

POOL CLEANING CONTROL SYSTEM

CROSS REFERENCE TO RELATED APPLICATIONS

This application is a continuation-in-part of U.S. Non-Provisional patent application Ser. No. 18/141,810 entitled "Pool Cleaning System Controller Valve" to Goettl, et al, that was filed on May 1, 2023, which claims the benefit of the filing date of U.S. Provisional Patent Application 63/336,574 entitled "Pool Cleaning System Controller Valve" to Goettl, et al, that was filed on Apr. 29, 2022, the disclosures of each of which are hereby incorporated herein by this reference. This application is also a continuation-in-part of U.S. Non-Provisional patent application Ser. No. 18/448,442 entitled "Intelligently Controlled Pool Cycling Valve" to Goettl, et al, that was filed on Aug. 11, 2023, which is a continuation of U.S. patent application Ser. No. 17/219,856 entitled "Intelligently Controlled Pool Cycling Valve", to Goettl et al., filed on Mar. 31, 2021, issuing as U.S. Pat. No. 11,725,742 on Aug. 15, 2023, which is a continuation-in-part of U.S. patent application Ser. No. 17/160,985 entitled "Pool Cycling Valve" to Goettl et. al., that was filed on Jan. 28, 2021, now issued as U.S. Pat. No. 11,686,397 on Jun. 27, 2023, the disclosures of each of which are hereby incorporated herein by this reference. This application also claims priority to and incorporates entirely herein by this reference U.S. Provisional Patent Application 63/410,957 entitled "Swimming Pool Cleaning Nozzle Aiming Tool" to Goettl, et al, that was filed Sep. 28, 2022, and U.S. Provisional Patent Application 63/410,963 entitled "Swimming Pool Down Jet Nozzle" to Goettl, et al, that was filed Sep. 28, 2022.

TECHNICAL FIELD

Aspects of this document relate generally to pool cleaning control systems, and more specifically to pool cleaning control systems with a controller valve and a distribution valve.

BACKGROUND

Conventional in-floor pool cleaning systems use a control valve with a single or multiple ports that feed a single or multiple cleaning zones within a pool. The in-floor cleaning heads within each zone are operated by providing water pressure to the water feed line feeding the zone of cleaning heads to cause the cleaning heads to rise into an extended position to spray water. Water pressure from the valve is then relieved to lower the cleaning heads into a lowered position without water spraying. Typically, in a multi-port control valve, the system then moves to a different zone and water is sprayed there, and the cycles continue with the system shifting to each zone to provide water for one cycle of the cleaning heads within that zone until the system itself cycles around to the beginning and starts the second cycle for the cleaning heads in the first zone. Thus, each cleaning head cleans one cycle position in each zone before starting the second cycle position in each zone. Additionally, the water turning off and on in the system to relieve and apply water pressure to the various zones creates increased wear and tear on the equipment and piping and can result in hammering of the valve from repeated shutting off and turning on.

SUMMARY

Aspects of this document relate to a pool control system comprising a controller valve having a water inlet configured to fluidly couple with a water pump and receive water from a pool into the controller valve, a primary water outlet and a bypass water outlet each fluidly coupled to the water inlet and configured to pass water out of the controller valve, and a hydro-valve configured to move between an open position in which the water passes from the water inlet to the primary water outlet and a closed position in which the water passes from the water inlet to the bypass water outlet, a distribution valve having an inlet port fluidly coupled to the primary water outlet of the controller valve, a plurality of outlet ports with an outlet port aperture configured to sequentially align with each of the plurality of outlet ports, and a pausing arm configured to move between a disengaged position in which the outlet port aperture is configured to align with a new outlet port of the plurality of outlet ports each time the hydro-valve moves from the open position to the closed position and an engaged position in which the pausing arm maintains a position of the outlet port aperture regardless of the position of the hydro-valve, a plurality of water zones each configured to fluidly couple with a respective outlet port of the plurality of outlet ports of the distribution valve, and a microcontroller configured to intelligently and selectively discharge water from the pool control system to each of the plurality of water zones by controlling the hydro-valve to move the position of the hydro-valve between the open position and the closed position and controlling the pausing arm to move the position of the pausing arm between the disengaged position and the engaged position.

Particular embodiments may include one or more of the following features. An interface configured to receive specific feature input from a user for each of a plurality of specific features including at least one of a customized sequence for discharging water to each of the plurality of water zones, a customized duration of time for discharging water individually at each of the plurality of water zones, and a customized number of water cycles for a particular water zone to receive prior to starting a water cycle in a subsequent water zone. The microcontroller may be configured to receive the input from the user and to control the hydro-valve and the pausing arm to intelligently and selectively discharge water to each of the plurality of water zones based on the input received through the interface. The customized number of water cycles may be a different value for each of at least two water zones of the plurality of water zones. The pool control system may be configured to communicatively couple with and be controllable over the internet.

Aspects of this document relate to a pool control system comprising a controller valve having a primary water outlet and a bypass water outlet, wherein the controller valve is configured to move between an open configuration in which the water passes from a water inlet to the primary water outlet and a closed configuration in which the water passes from the water inlet to the bypass water outlet, a distribution valve having an inlet port fluidly coupled to the primary water outlet of the controller valve, and a plurality of outlet ports with an outlet port aperture configured to sequentially align with each of the plurality of outlet ports, wherein the outlet port aperture is configured to align with a new outlet port of the plurality of outlet ports each time the controller valve moves from the open configuration to the closed configuration, a plurality of water zones each configured to fluidly couple with a respective outlet port of the plurality of outlet ports of the distribution valve, and a microcontroller configured to intelligently and selectively discharge water from the pool control system to each of the plurality of water zones by controlling the controller valve to change the configuration of the controller valve between the open configuration and the closed configuration.

Particular embodiments may include one or more of the following features. The controller valve may have a water inlet configured to fluidly couple with a water pump and receive water from a pool into the controller valve. The distribution valve may further include a pausing arm configured to move between a disengaged position in which the outlet port aperture is configured to align with a new outlet port of the plurality of outlet ports each time the controller valve moves from the open configuration to the close configuration and an engaged position in which the pausing arm maintains a position of the outlet port aperture regardless of the configuration of the controller valve. The microcontroller may be configured to control the pausing arm to move the position of the pausing arm between the disengaged position and the engaged position and pause the distribution valve at a selected outlet port of the plurality of outlet ports so long as the pausing arm is in the engaged position. An interface configured to receive specific feature input from a user for each of a plurality of specific features of the pool control system including at least one of a customized sequence for discharging water to each of the plurality of water zones, a customized duration of time for each of the respective plurality of water zones for discharging water individually at each of the respective plurality of water zones, and a customized number of water cycles for a particular water zone to receive prior to starting a water cycle in a subsequent water zone. The microcontroller may be configured to receive the input from the user and to control the controller valve to intelligently and selectively discharge water to each of the plurality of water zones based on the input received from the interface. The customized number of water cycles may be a different value for each of at least two water zones of the plurality of water zones. The pool control system may be configured to communicatively couple with and be controllable over the internet.

Aspects of this document relate to a pool control system comprising a controller valve configured to selectively pass water to a primary water outlet of the controller valve, a distribution valve fluidly coupled to the primary water outlet of the controller valve and configured to individually select each of a plurality of outlet ports of the distribution valve and select a new outlet port each time the controller valve begins passing water to the primary water outlet, a plurality of water zones each configured to fluidly couple with a respective outlet port of the plurality of outlet ports of the distribution valve, and a microcontroller configured to intelligently and selectively discharge water to each of the plurality of water zones by controlling the controller valve. The microcontroller may be configured to receive specific input from a user for each of the plurality of water zones to program the pool control system with at least one of a customized sequence for discharging water to each of the plurality of water zones, a customized duration of time for each of the plurality of water zones for discharging water individually at each of the plurality of water zones, and a customized number of water cycles for a particular water zone to receive prior to starting a water cycle in a subsequent water zone. The distribution valve may have an outlet port aperture configured to align with a new outlet port of the plurality of outlet ports each time the controller valve moves from the open configuration to the closed configuration. The distribution valve may have a pausing arm configured to move between a disengaged position in which the outlet port aperture is configured to align with a new outlet port of the plurality of outlet ports each time the controller valve moves from the open configuration to the close configuration and an engaged position in which the pausing arm maintains a position of the outlet port aperture regardless of the configuration of the controller valve, wherein the microcontroller is configured to control the pausing arm to move the position of the pausing arm between the disengaged position and the engaged position. An interface may be configured to receive specific feature input from a user for each of a plurality of specific features of the pool control system including at least two of a customized sequence for discharging water to each of the plurality of water zones, a customized duration of time for each of the plurality of water zones for discharging water individually at each of the plurality of water zones, and a customized number of water cycles for a particular water zone to receive water prior to starting a water cycle in a subsequent water zone. The microcontroller may be configured to receive the input from the user and to control the controller valve to intelligently and selectively discharge water to each of the plurality of water zones based on the input received through the interface. The customized number of water cycles may be a different value for each of at least two water zones of the plurality of water zones.

Aspects of this document relate to a controller valve comprising a valve body having a water inlet configured to fluidly couple with a water pump and receive water from a pool into the valve body, the valve body further having a primary water outlet and a bypass water outlet each fluidly coupled to the water inlet and configured to pass water out of the valve body, wherein the primary water outlet is configured to pass the water to a pool cleaning system and the bypass water outlet is configured to pass the water upstream from the water pump, a valve cartridge positioned within the valve body and configured to selectively direct a flow of water through the valve body to the primary water outlet and the bypass water outlet, the valve cartridge having a diaphragm positioned within the valve cartridge and configured to fluidly isolate an upper chamber from a lower chamber within the valve cartridge, a piston attached to the diaphragm and configured to move linearly within the valve cartridge between an upper position and a lower position, wherein a volume of the upper chamber of the valve cartridge changes as the piston moves between the upper position and the lower position, a plunger attached to and movable with the piston, wherein the plunger is configured to plug the primary water outlet to limit water flow through the primary water outlet when the piston is in the upper position and unplug the primary water outlet to allow water flow through the primary water outlet when the piston is in the lower position, and a bypass gate attached to and movable with the piston, wherein the bypass gate is configured to allow water flow through the bypass water outlet when the piston is in the upper position and limit water flow through the bypass water outlet when the piston is in the lower position, a hydro-valve fluidly coupling the upper chamber to the lower chamber around the diaphragm, the hydro-valve comprising a ball valve having a moveable ball therein sized and shaped to cover and seal an upper chamber inlet port, and a cam positioned adjacent to the hydro-valve, the cam having an axis, wherein the cam is rotatably coupled to a motor along the axis of the cam, wherein a radius of the cam varies around a perimeter of the cam, and wherein the cam is rotatable between an open position where the cam extends in front of the upper chamber inlet port and displaces the ball from the upper chamber inlet port and a closed position where the cam allows the ball to cover and seal the upper chamber inlet port, wherein, when the cam is in the open position and water is supplied through the water inlet, water flows through the hydro-valve into the upper chamber of the valve cartridge, a difference in water pressure between the lower chamber and the upper chamber decreases, and water pressure within the lower chamber moves the plunger and the piston into the lower position, allowing water flow through the primary water outlet and limiting water flow through the bypass water outlet, and wherein, when the cam is in the closed position and water is supplied through the water inlet, the ball covers the upper chamber inlet port of the hydro-valve, the difference in water pressure between the lower chamber and the upper chamber increases, and the water pressure within the lower chamber moves the piston and the plunger into the upper position, limiting water flow through the primary water outlet and allowing water flow through the bypass water outlet.

Particular embodiments may comprise one or more of the following features. The upper chamber may be fluidly coupled to the bypass water outlet through a bleed line configured to drain water from the upper chamber to the bypass water outlet. The controller valve may further comprise a screen positioned to filter water passing from the lower chamber to the hydro-valve. The plunger may have a seal ring around an edge of the plunger configured to help the plunger to plug the primary water outlet when the piston is in the upper position.

Aspects of this document relate to a controller valve comprising a valve body having a water inlet configured to fluidly couple with a water pump and receive water from a pool into the valve body, the valve body further having a primary water outlet and a bypass water outlet each fluidly coupled to the water inlet and configured to pass water out of the valve body, a valve cartridge positioned within the valve body and configured to selectively direct a flow of water through the valve body to the primary water outlet and the bypass water outlet, the valve cartridge having a diaphragm positioned within the valve cartridge and configured to fluidly isolate an upper chamber from a lower chamber within the valve cartridge, and a piston attached to the diaphragm and configured to move linearly within the valve cartridge between an upper position and a lower position, wherein a volume of the upper chamber of the valve cartridge changes as the piston moves between the upper position and the lower position, and a hydro-valve fluidly coupling the upper chamber to the lower chamber around the diaphragm, the hydro-valve comprising a ball valve having a moveable ball therein sized and shaped to cover an upper chamber inlet port, wherein, when the ball is removed from covering the upper chamber inlet port and water is supplied through the water inlet, water pressure moves the piston into the lower position, allowing water flow through the primary water outlet and limiting water flow through the bypass water outlet, and wherein, when the ball covers the upper chamber inlet port and water is supplied through the water inlet, water pressure moves the piston into the upper position, limiting water flow through the primary water outlet and allowing water flow through the bypass water outlet.

Particular embodiments may comprise one or more of the following features. The controller valve may further comprise a plunger attached to and movable with the piston, wherein the plunger is configured to plug the primary water outlet to limit water flow through the primary water outlet when the piston is in the upper position and unplug the primary water outlet to allow water flow through the primary water outlet when the piston is in the lower position. The controller valve may further comprise a bypass gate attached to and movable with the piston, wherein the bypass gate is configured to uncover a bypass opening to allow water flow through the bypass water outlet when the piston is in the upper position and cover the bypass opening to limit water flow through the bypass water outlet when the piston is in the lower position. The controller valve may further comprise a cam positioned adjacent to the hydro-valve, wherein the cam is rotatable between an open position where the cam extends in front of the upper chamber inlet port and displaces the ball from the upper chamber inlet port and a closed position where the cam allows the ball to cover the upper chamber inlet port. The cam may have an axis and may be rotatably coupled to a motor along the axis of the cam. A radius of the cam may vary around a perimeter of the cam. When the ball is removed from covering the upper chamber inlet port and water is supplied through the water inlet, water may flow through the hydro-valve into the upper chamber of the valve cartridge and a difference in water pressure between the lower chamber and the upper chamber may decrease. When the ball covers the upper chamber inlet port, the difference in water pressure between the lower chamber and the upper chamber may increase.

Aspects of this document relate to a controller valve comprising a valve body having a water inlet configured to fluidly couple with a water pump and receive water from a pool into the valve body, the valve body further having a primary water outlet and a bypass water outlet each fluidly coupled to the water inlet and configured to pass water out of the valve body, and a valve cartridge positioned within the valve body and configured to selectively direct a flow of water through the valve body to the primary water outlet and the bypass water outlet, the valve cartridge having a diaphragm positioned within the valve cartridge and configured to fluidly isolate an upper chamber from a lower chamber within the valve cartridge, and a piston attached to the diaphragm and configured to move within the valve cartridge between an upper position and a lower position, wherein a volume of the upper chamber of the valve cartridge changes as the piston moves between the upper position and the lower position, wherein both the upper chamber and the lower chamber have variable amounts of water during use, and wherein when the piston is in the upper position, the valve cartridge limits water flow through the primary water outlet and allows water flow through the bypass water outlet, and when the piston is in the lower position, the valve cartridge allows water flow through the primary water outlet and limits water flow through the bypass water outlet.

Particular embodiments may comprise one or more of the following features. The controller valve may further comprise a hydro-valve fluidly coupling the upper chamber to the lower chamber around the diaphragm, the hydro-valve comprising a ball valve having a moveable ball therein sized and shaped to cover an upper chamber inlet port. When the ball covers the upper chamber inlet port and water is supplied through the water inlet, water pressure may move the piston into the lower position, allowing water flow through the primary water outlet and limiting water flow through the bypass water outlet. When the ball is removed from the upper chamber inlet port and water is supplied through the water inlet, water pressure may move the piston into the upper position, limiting water flow through the primary water outlet and allowing water flow through the bypass water outlet. The controller valve may further comprise a cam positioned adjacent to the hydro-valve, wherein the cam is rotatable between an open position where the cam extends in front of the upper chamber inlet port and displaces the ball from the upper chamber inlet port and a closed position where the cam allows the ball to cover the upper chamber inlet port. The cam may have an axis and may be rotatably coupled to a motor along the axis of the cam. A radius of the cam may vary around a perimeter of the cam. The controller valve may further comprise a plunger attached to and movable with the piston, wherein the plunger is configured to plug the primary water outlet to limit water flow through the primary water outlet when the piston is in the upper position and unplug the primary water outlet to allow water flow through the primary water outlet when the piston is in the lower position, and a bypass gate attached to and movable with the piston, wherein the bypass gate is configured to uncover a bypass opening to allow water flow through the bypass water outlet when the piston is in the upper position and cover the bypass opening to limit water flow through the bypass water outlet when the piston is in the lower position.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Figure 1:
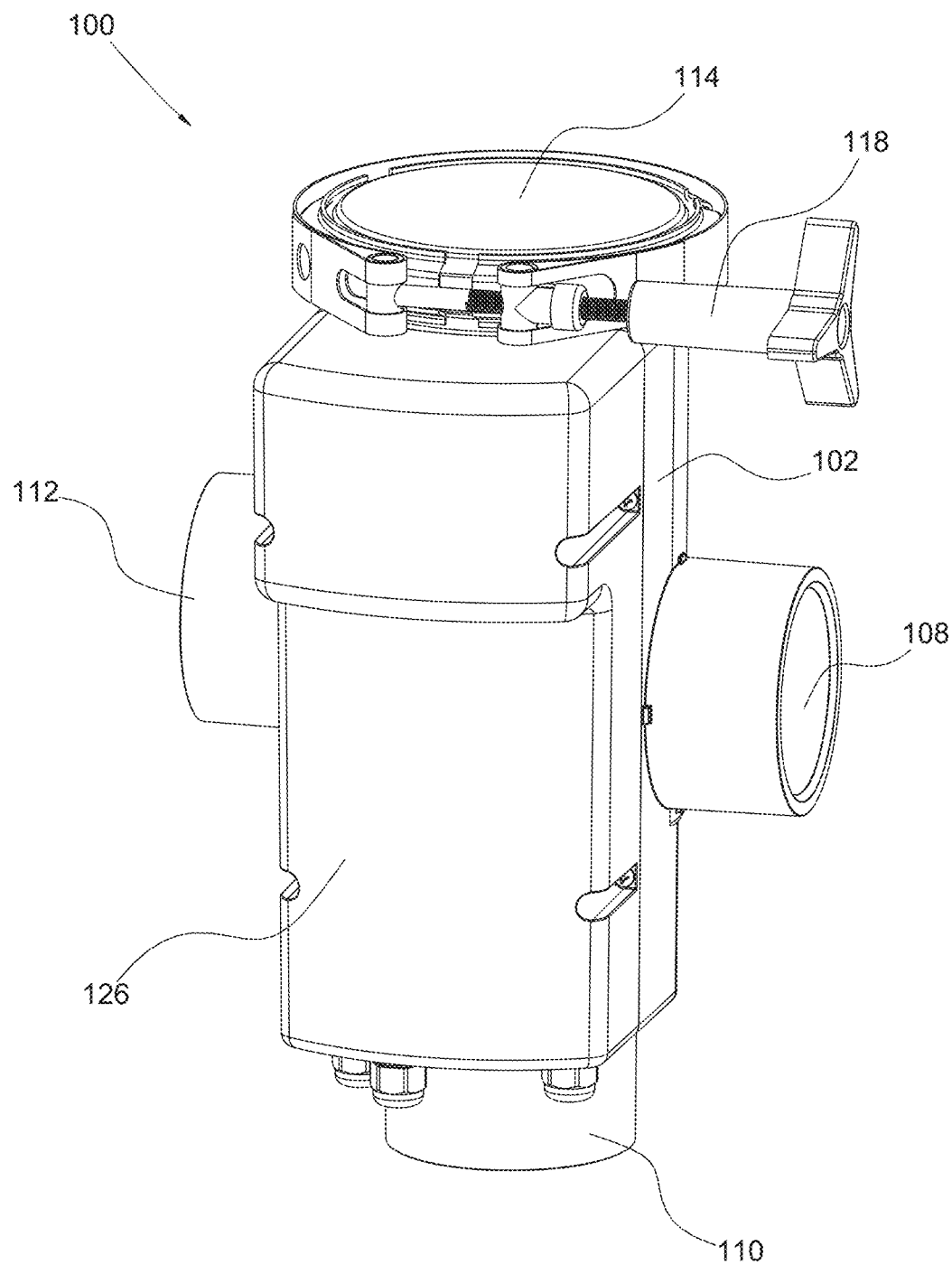
FIG. 1 is a perspective view of a controller valve.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a controller valve 100 for a pool cleaning system 10. The controller valve 100 may be used as a controller in the pool cleaning system 10 by using hydraulic and/or electronic/digital control communication with a single or multiple distribution valve(s) 12 that operate by the introduction and cessation of water flow. For example, the controller valve 100 may be configured to control distribution valves 12 down the line from the controller valve 100 through the pattern of water flow that the controller valve 100 allows through to the distribution valves 12, such as through stopping and starting water flow to the distribution valves 12. Examples of such a distribution valve 12 can be found in U.S. patent application Ser. No. 17/160,985 to Goettl et al., filed on Jan. 28, 2021, titled "Pool Cycling Valve" which issued as U.S. patent Ser. No. 11/686,397 on Jun. 27, 2023 and U.S. patent application Ser. No. 17/219,856 to Goettl et al., filed Mar. 31, 2021, titled "Intelligently Controlled Pool Cycling Valve" which issued as U.S. patent Ser. No. 11/725,742 on Aug. 15, 2023, the disclosures of which are hereby incorporated herein by this reference. The controller valve 100 is configured to limit water flow to the distribution valves 12 without requiring that the pump 14 used in the pool cleaning system 10 be turned off. In some embodiments, the controller valve 100 diverts the flow of water rather than block the flow of water as is done in conventional pool cleaning systems.

Figure 2:
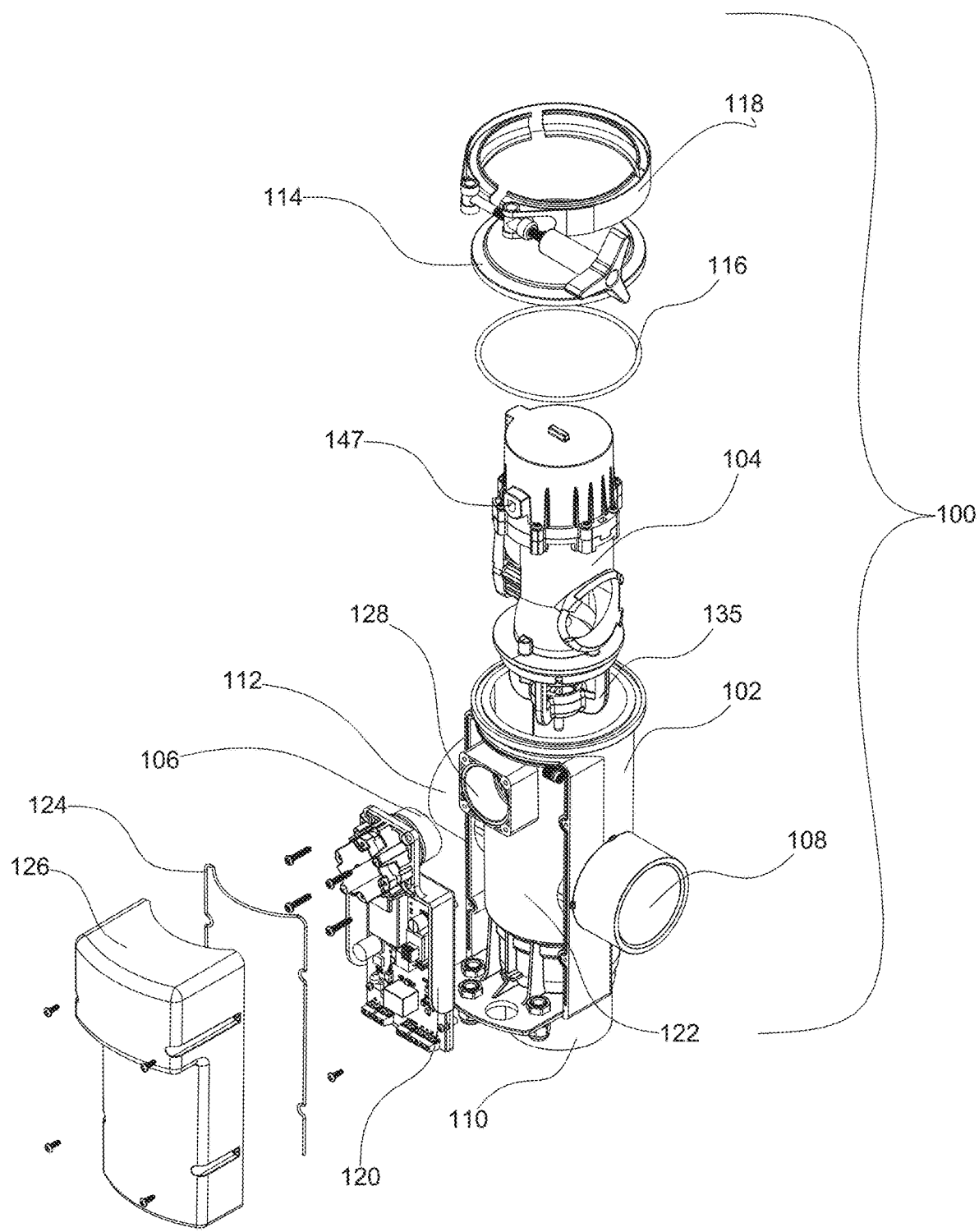
FIG. 2 is an exploded view of the controller valve shown in FIG. 1.

As shown in FIGS. 1 and 2, the controller valve 100 comprises a valve body 102 and a valve cartridge 104. In some embodiments, the controller valve 100 also comprises a hydro-valve 106. The valve body 102 has a water inlet 108 that is configured to fluidly couple with the water pump 14 of the pool cleaning system 10 or other source of pressurized water. This allows the controller valve 100 to receive water flowing into the pool cleaning system 10 through the pump 14. The valve body 102 also has a primary water outlet 110 and a bypass water outlet 112. Each of the primary water outlet 110 and the bypass water outlet 112 are configured to fluidly couple to the water inlet 108 and to pass water out of the valve body 102. The primary water outlet 110 is configured to be fluidly coupled to the pool cleaning system 10, with distribution valves 12 or cleaning nozzle 16 downstream from the primary water outlet 110. The bypass water outlet 112 is also configured to be fluidly coupled to an acceptable bypass location. In some embodiments, the bypass water outlet 112 is configured to pass water to a point in the system 10 on the suction side of the pump 14. Such embodiments allow water to circulate within the system 10 without returning to the pool. In other embodiments, the bypass water outlet 112 passes water to the pool of water from which the water is drawn into the controller valve 100. In either case, the water pressure at the bypass water outlet 112 is less than the water pressure in the main system prior to the controller valve 100.

The valve cartridge 104 is positioned within the valve body 102. The valve cartridge 104 is configured to selectively direct the flow of water through the valve body 102 to the primary water outlet 110 and the bypass water outlet 112. For example, in some situations, the valve cartridge 104 directs the flow of water through the primary water outlet 110, while in other situations, the valve cartridge 104 directs the flow of water through the bypass water outlet 112. As will be understood by one of skill in the art, the fact that the valve cartridge 104 directs the flow of water through either the primary water outlet 110 or the bypass water outlet 112 does not mean that no water passes through the other of the primary water outlet 110 and the bypass water outlet 112 at the same time. Instead, some water may pass through the primary water outlet 110 when the flow of water is directed to the bypass water outlet 112 and vice versa.

As shown in FIG. 2, the valve body 102 may have a cap 114 configured to cover the valve cartridge 104 within the valve body 102. The cap 114 may include a gasket 116 and may be attached to the valve body 102 through a band clamp 118 configured to tighten onto the cap 114 and the valve body 102. As shown, the valve cartridge 104 is removeable from the valve body 102. This allows the valve cartridge 104 to be replaced as needed without requiring that the valve body 102 be replaced as well. The controller valve 100 may also have an electronics assembly 120 configured to attach to a front 122 of the valve body 102. The electronics assembly 120 may be sealed with a gasket 124 and may have a cover 126 configured to protect the electronics assembly 120 from water. Also shown in FIG. 2, the valve body 102 may have a port aperture 128 extending through the front 122 of the valve body 102. The port aperture 128 is configured to engage, interface, or otherwise couple with the hydro-valve 106 and allow the valve cartridge 104 to fluidly couple with the hydro-valve 106, as discussed in more detail below.

Figure 3:
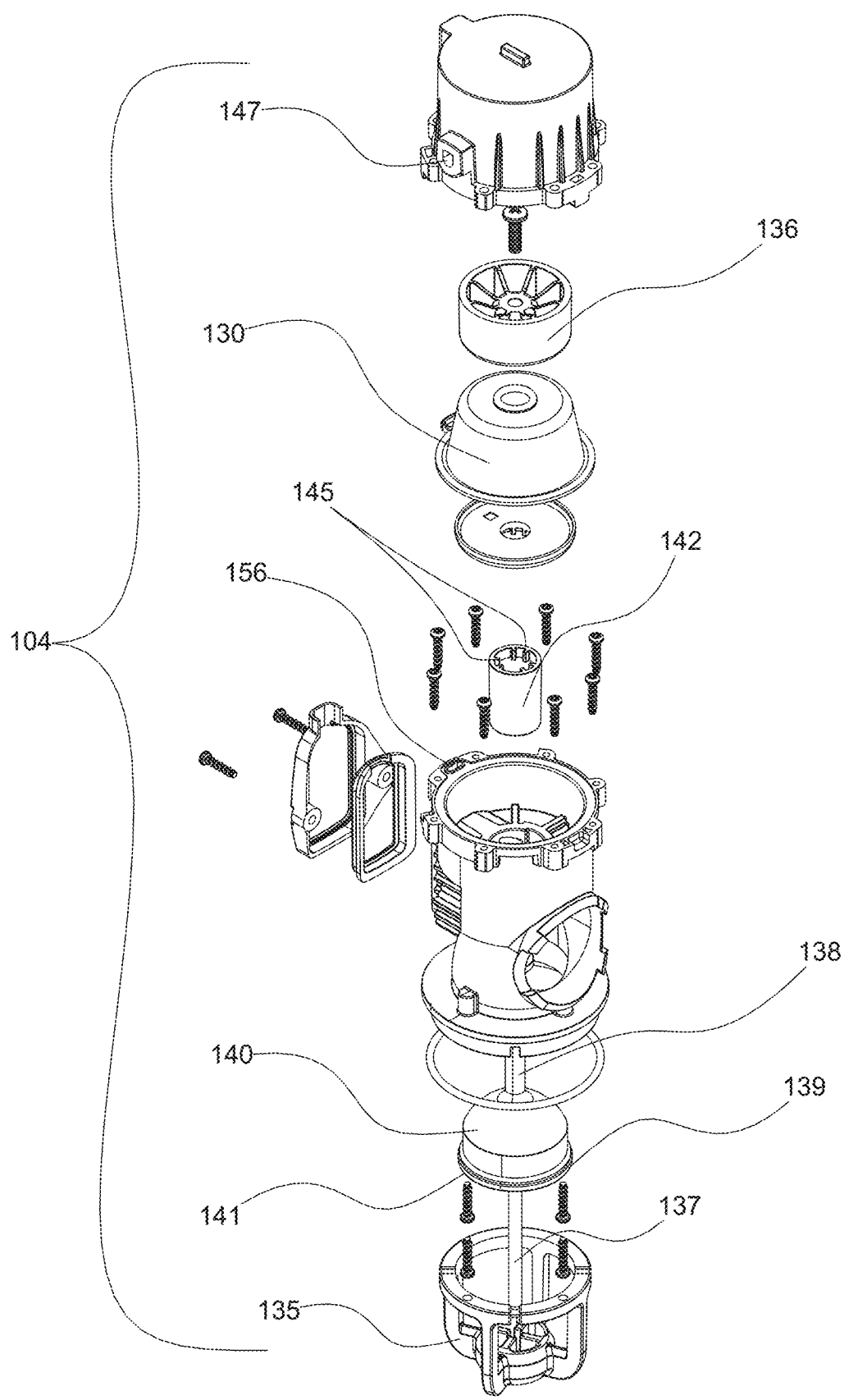
FIG. 3 is an exploded view of the valve cartridge of the controller valve shown in FIG. 1.
Figure 5A:
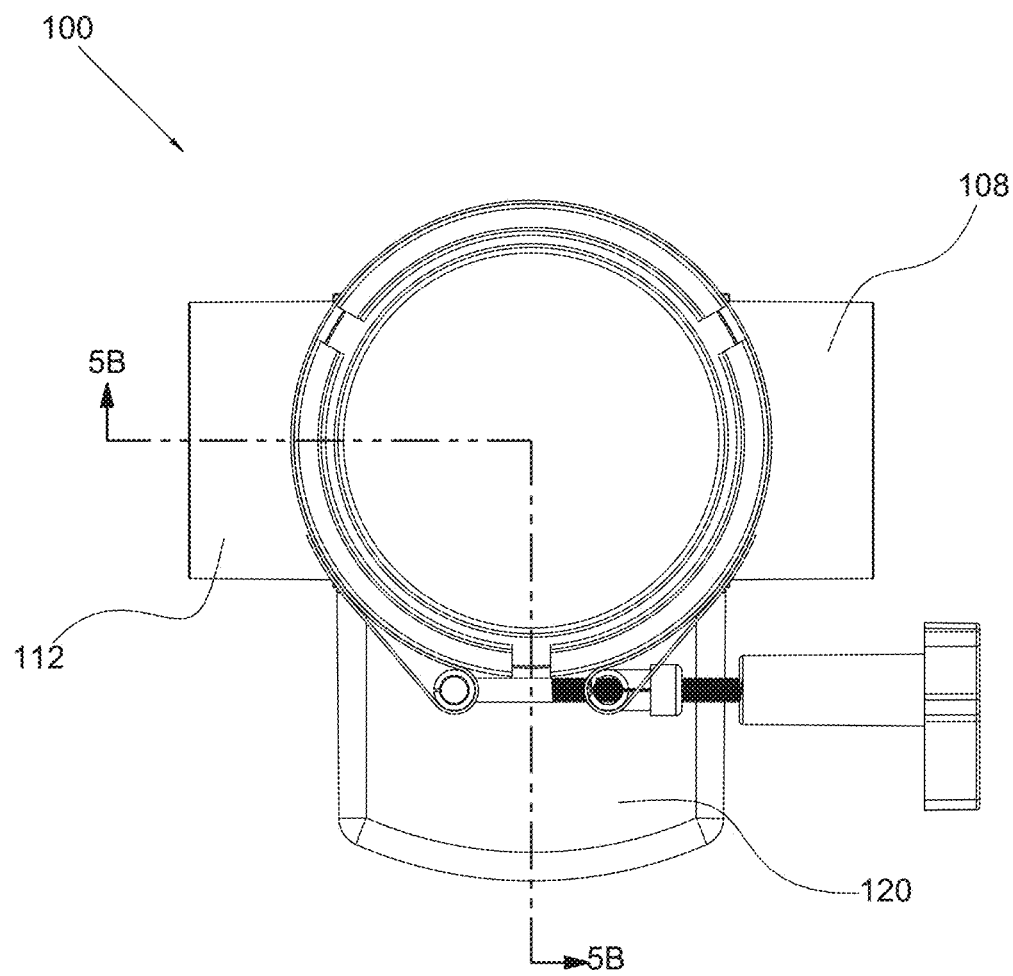
FIG. 5A is a top view of the controller valve shown in FIG. 1.
Figure 5B:
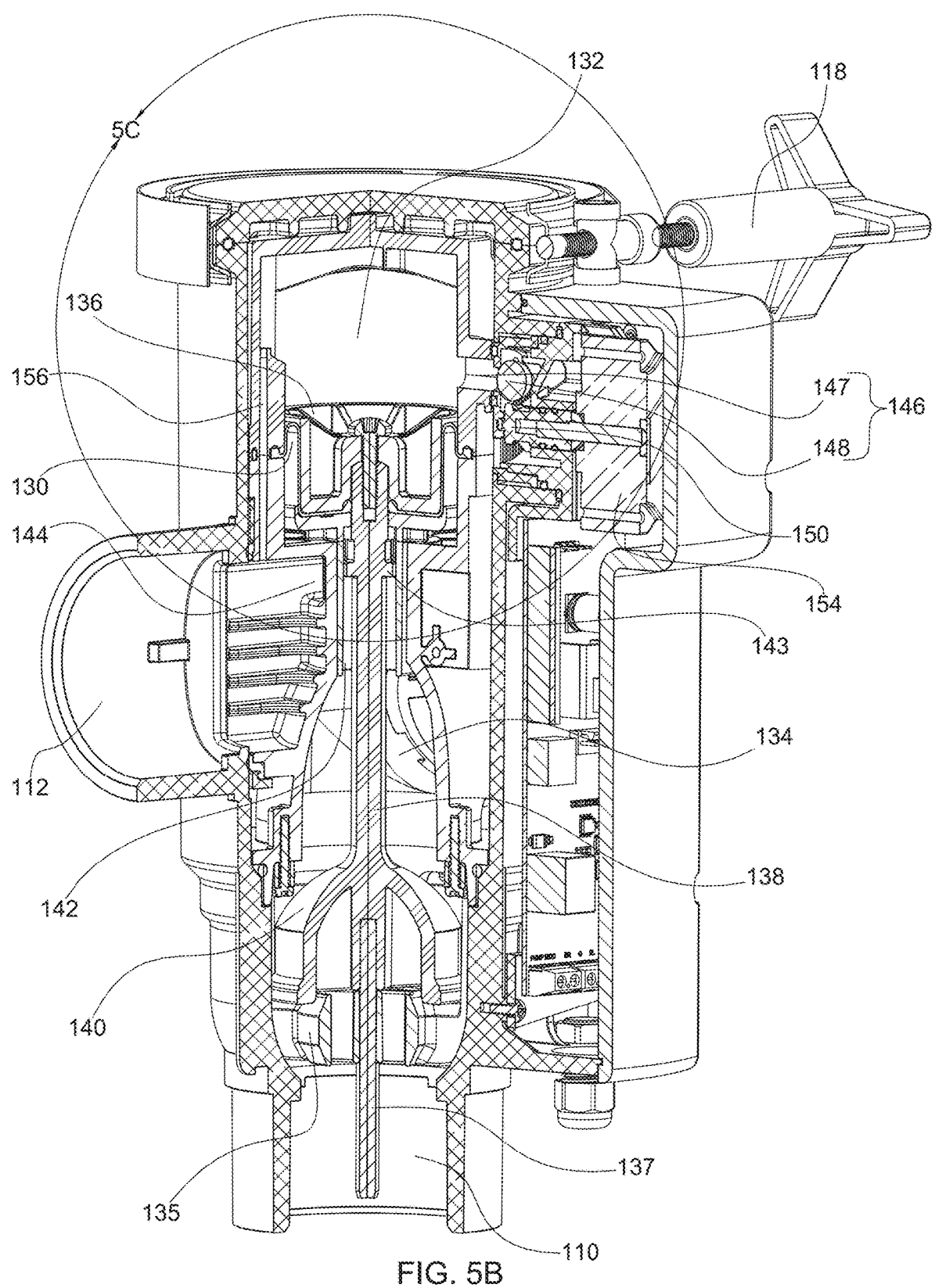
FIG. 5B is a cross-section view of the controller valve taken from line 5B-5B shown in FIG. 5A, showing the piston in the lower position.

Turning to FIG. 3, the valve cartridge 104 may have a diaphragm 130 positioned within the valve cartridge 104. The diaphragm 130 is configured to fluidly isolate an upper chamber 132 from a lower chamber 134 within the valve cartridge 104 (see FIGS. 5B, 5D, and 6B). In other words, the diaphragm 130 divides the interior of the valve cartridge 104 into the upper chamber 132 and the lower chamber 134 and prevents water flow directly between the upper chamber 132 and the lower chamber 134. However, the upper chamber 132 and the lower chamber 134 may be fluidly coupled through a pathway for water that circumvents the diaphragm 130, such as through port aperture 128 (see FIG. 2). The pathway the circumvents the diaphragm 130 does not necessarily leave the valve cartridge 104.

The diaphragm 130 is formed of a material that allows the diaphragm 130 to flex in response to changes in the pressure differential between the upper chamber 132 and the lower chamber 134. For example, when the water pressure in the lower chamber 134 rises above the water pressure in the upper chamber 132, the diaphragm 130 is configured to react to this pressure change by rising toward the upper chamber 132, causing the volume of the lower chamber 134 to increase and the volume of the upper chamber 132 to decrease. Likewise, when the water pressure in the upper chamber 132 approaches the same value as the water pressure in the lower chamber 134, the diaphragm 130 is rendered inert and is more easily moveable. This allows water passing through the lower chamber 134 to push the plunger 140 down, which pulls the diaphragm 130 down with it, as will be described in more detail below. This causes the volume of the lower chamber 134 to decrease and the volume of the upper chamber 132 to increase.

Figure 7A:
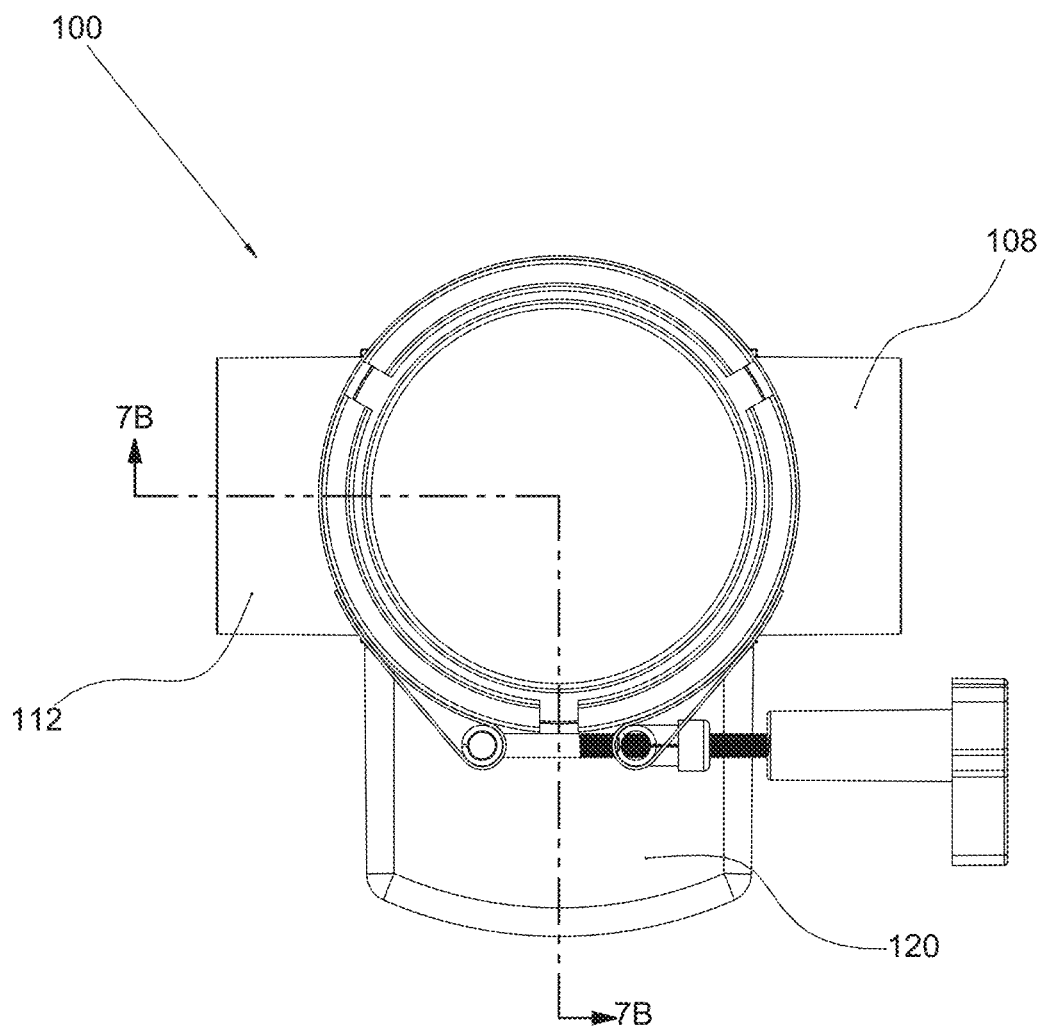
FIG. 7A is a top view of the controller valve shown in FIG. 1.
Figure 7B:
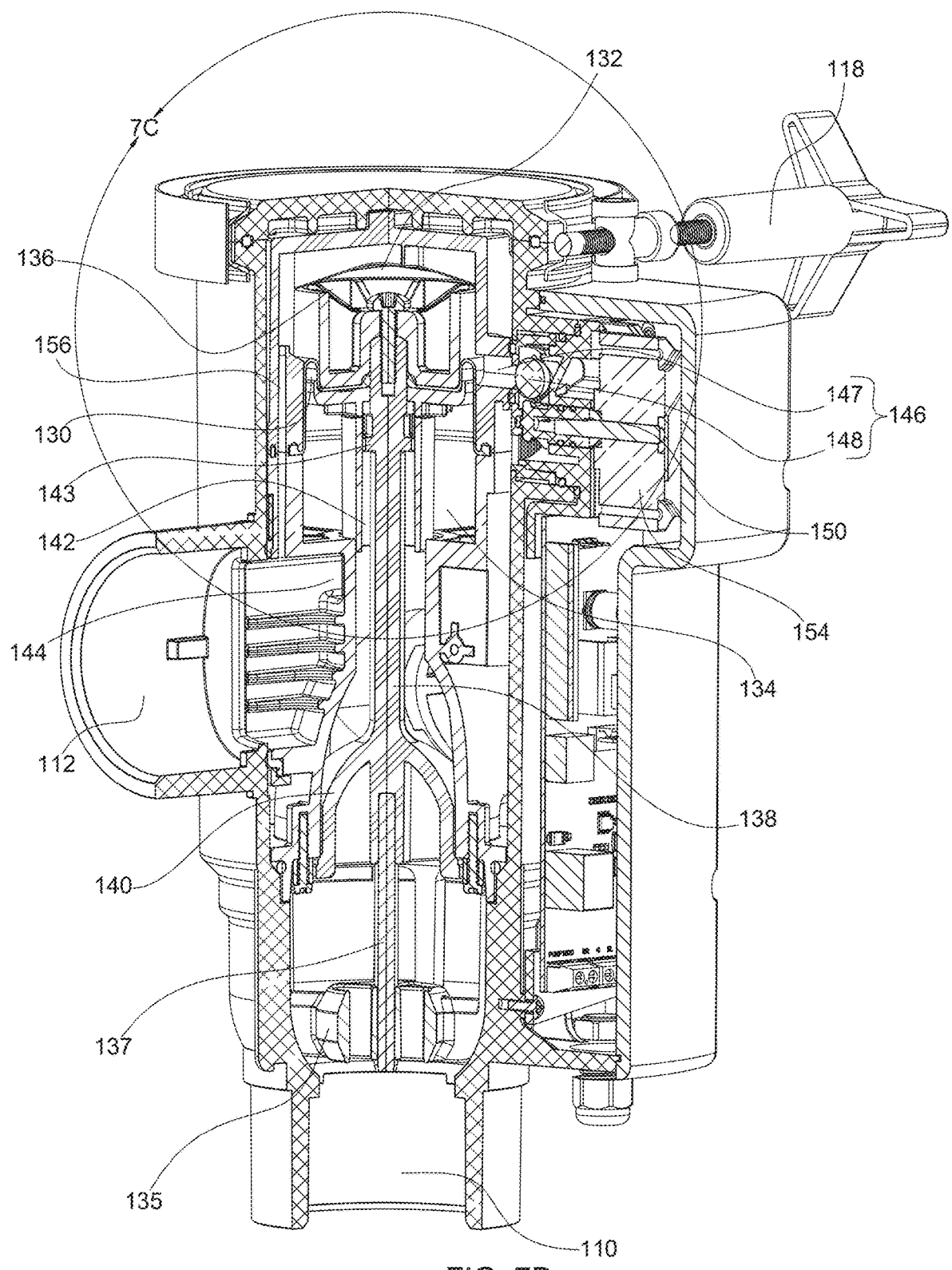
FIG. 7B is a cross-section view of the controller valve taken from line 7B-7B shown in FIG. 7A, showing the piston in the upper position.
Figure 7C:
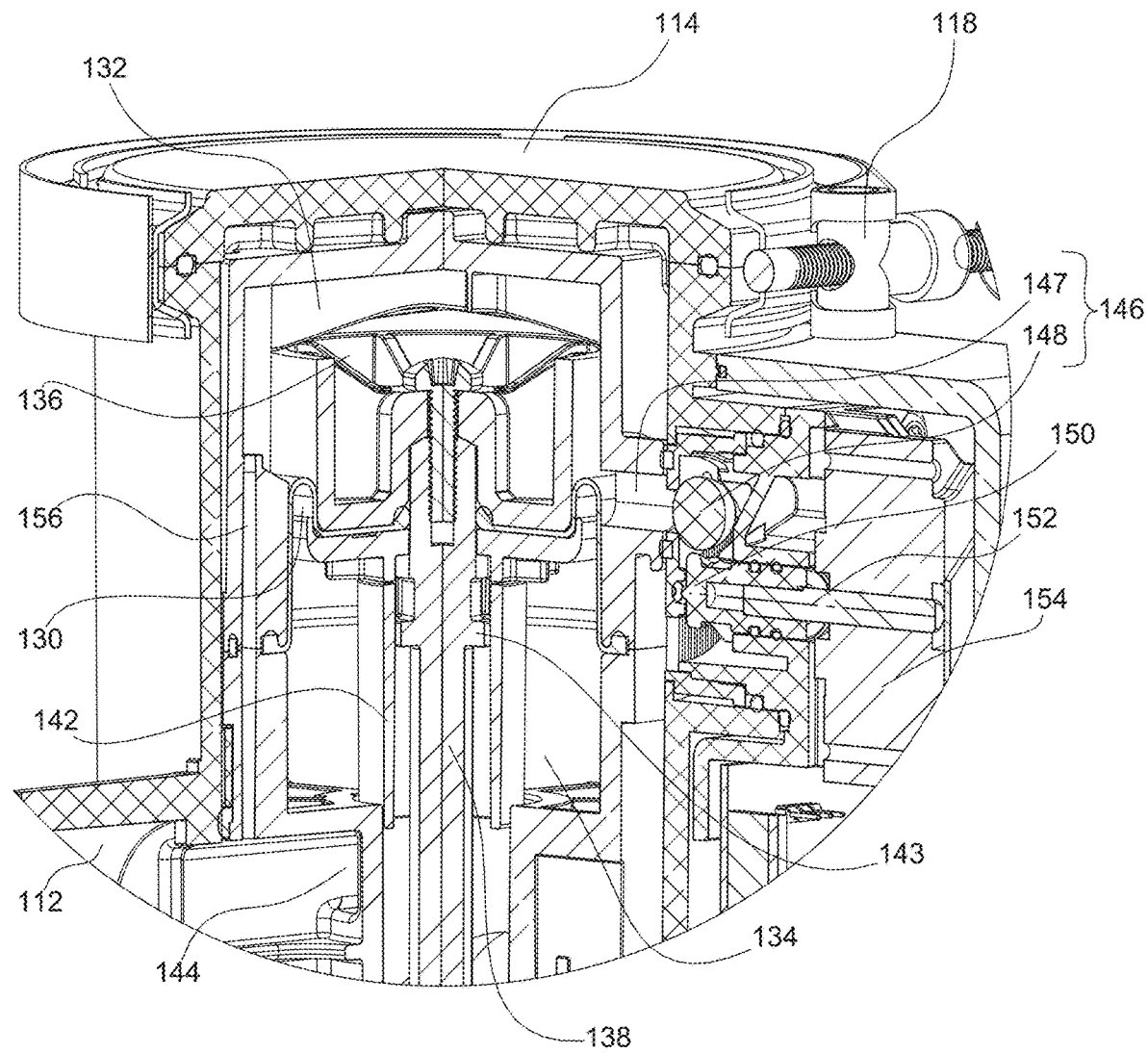
FIG. 7C is a close-up view of the controller valve taken from circle 7C shown in FIG. 7B.

A piston 136 may be attached to the diaphragm 130. As the diaphragm 130 moves as described above, the piston 136 is configured to move within the valve cartridge 104 between an upper position (see FIG. 7B) and a lower position (see FIG. 5B). In some embodiments, the piston 136 is configured to move linearly within the valve cartridge 104. A stem 138 may extend downward from the piston 136 and a plunger 140 may be attached to the stem 138 such that the plunger 140 is attached to and movable with the piston 136. When the piston 136 is in the upper position (FIG. 7B), the plunger 140 is configured to plug the primary water outlet 110 to limit water flow through the primary water outlet 110. When the piston 136 is in the lower position (FIG. 5B), the plunger 140 is configured to unplug the primary water outlet 110 to allow water flow through the primary water outlet 110. The plunger 140 may have a seal ring 139 around an edge 141 of the plunger 140 as shown in FIG. 3. The seal ring 139 may be configured to help the plunger 140 to plug the primary water outlet 110 when the piston 136 is in the upper position.

In some embodiments, the valve body 102 may also comprise an alignment pin 137 fixedly attached to the stem 138. The alignment pin 137 may be press fit, molded, or glued to the stem 138. Other fixing methods may also be implemented. The alignment pin 137 may be aligned with the stem 138 and may extend past the plunger 140 to slidably couple with an alignment bracket 135. The alignment bracket 135 is fixed to the valve cartridge 104, such as through screws or any other method of fixing one component to another, and is configured to center the alignment pin 137 on the valve cartridge 104. This stabilizes the stem 138 and the alignment pin 137 as the piston 136, stem 138, and the alignment pin 137 move between the upper position and the lower position. In some embodiments, rather than having a separate alignment pin 137, the stem 138 may simply extend down past the plunger 140 to slidably couple with the alignment bracket 135 with the same effect of stabilizing the stem 138.

A bypass gate 142 may also be attached to the stem 138, and therefore be attached to and movable with the piston 136. The lower chamber 134 of the valve cartridge 104 is configured to direct water flow such that water within the lower chamber 134 can only exit the valve body 102 through the bypass water outlet 112 by passing through a bypass opening 144 in the valve cartridge 104 or through the port aperture 128 (see FIG. 2) and the hydro-valve 106. Water flow through the bypass opening 144 is controlled by the bypass gate 142. Thus, when the piston 136 is in the upper position, the bypass gate 142 is configured to allow water flow through the bypass opening 144 and the bypass water outlet 112, and when the piston 136 is in the lower position, the bypass gate 142 covers the bypass opening 144, limiting water flow through the bypass water outlet 112. Water flow through the hydro-valve 106 is discussed in more detail below.

The size of the bypass opening 144 is an important aspect of the controller valve 100. The controller valve 100 is configured to reduce large pressure changes within the controller valve 100 during use. If the bypass opening 144 were the same size the bypass water outlet 112, which is typically 2 inches, whenever the bypass gate 142 opened to allow water flow through the bypass opening 144, the water pressure would change suddenly within the valve body 102. To avoid this sudden water pressure change, the bypass opening 144 may be sized much smaller than the bypass water outlet 112. In some embodiments, the bypass opening 144 is sized at less than or equal to one inch. In a particular embodiment, the bypass opening 144 is a ¾-inch opening. This helps to reduce the sudden water pressure change within the valve body that would otherwise occur when the bypass gate 142 is opened.

In some embodiments, the bypass gate 142 is attached to the stem 138 in a manner that keeps the bypass gate 142 rigidly coupled to the stem 138 in a direction parallel with the stem 138 but allows the bypass gate 142 to move with respect to the stem 138 in a direction perpendicular to the stem 138. In other words, the bypass gate 142 may be positionally fixed with respect to the stem 138 in a direction parallel to the stem 138 such that any movement of the stem 138 along its axis directly translates to the same movement of the bypass gate 142 in the same direction, while the bypass gate 142 is positionally free to move in a direction perpendicular to the stem 138 even when the stem 138 does not move in that direction. This may decrease the pressure needed to move the piston 136 and the stem 138 between the upper position and the lower position because the bypass gate 142 is not pressed up against any stationary surface as it moves up and down. Instead, little friction occurs because the bypass gate 142 can simply lift away from any stationary surface that it comes in contact with. Once the bypass gate 142 is in a position to cover the bypass opening 144, water pressure within the valve body 102 pushes the bypass gate 142 up against the bypass opening 144 and seats the bypass gate 142 to limit water flow through the bypass opening 144 as described above.

Figure 5C:
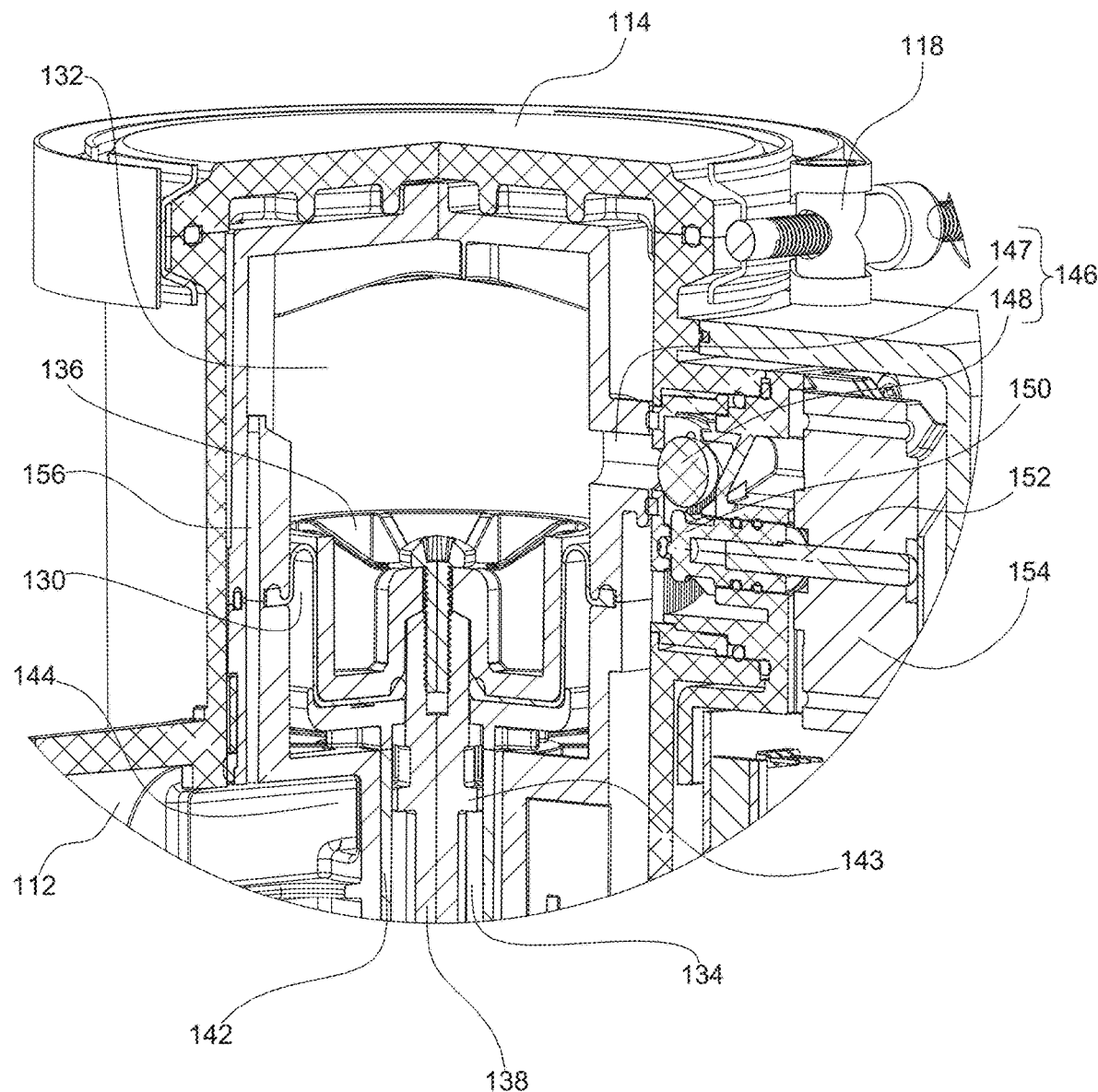
FIG. 5C is a close-up view of the controller valve taken from circle 5C shown in FIG.

In some embodiments, the bypass gate 142 is a sleeve that extends around the stem 138. The stem 138 may have an annular ridge 143 integrally formed with the stem 138 and extending outward from the stem 138. The bypass gate 142 may be configured to engage with the annular ridge 143 to fix the bypass gate 142 to the stem 138 in the direction parallel with the stem 138 as discussed above. For example, the bypass gate 142 may have teeth 145 (see FIG. 3) or some other protrusion extending inward from the sleeve to engage with the annular ridge 143. As can be seen in the close-up views of FIGS. 5C, 5E, and 6C, the bypass gate 142 has some room to move within the lower chamber 134 to allow for this motion in the direction perpendicular to the stem 138. The teeth 145 may be sized to limit motion of the bypass gate 142 with respect to the stem 138 in a direction parallel to the stem 138.

As will be apparent to one of skill in the art, the present disclosure specifically discusses a controller valve 100 that is different from conventional valves because, rather than controlling the flow of water by blocking water flow and then allowing water flow, the controller valve 100 is a three-way valve that receives water through the water inlet 108 and then directs the majority of that water either to the primary water outlet 110 or the bypass water outlet 112 so that water is always flowing while the pump 14 is running. This is known to be difficult to do because of the large pressure differentials required. These large pressure differentials cause increased stress in most valves, leading to premature failure of the valve. The controller valve 100 disclosed herein avoids these problems by including the hydro-valve 106.

Figure 4:
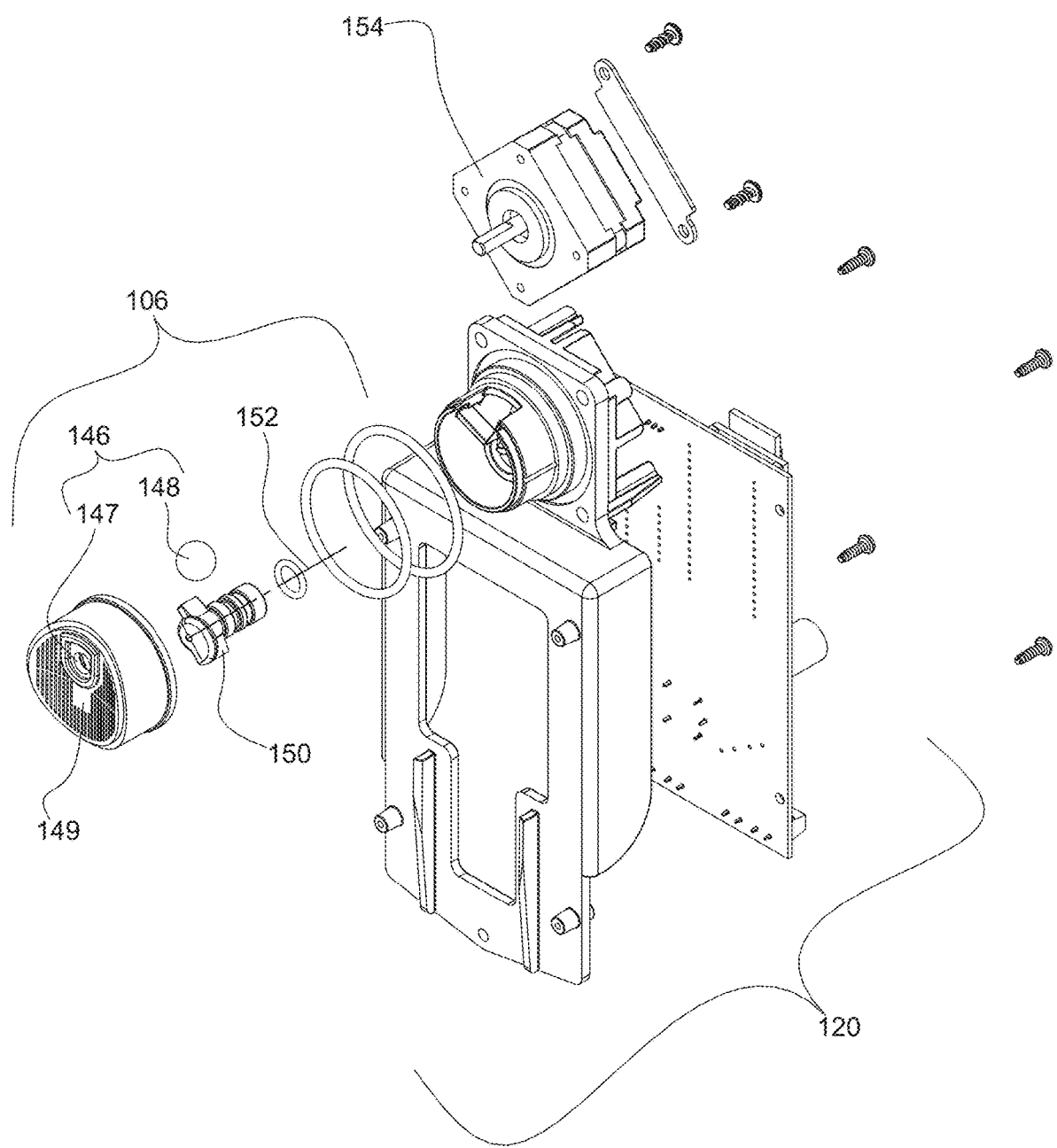
FIG. 4 is an exploded view of the hydro-valve assembly of the controller valve shown in FIG. 1.

As mentioned above, the upper chamber 132 may be fluidly coupled to the lower chamber 134 through the port aperture 128 and the hydro-valve 106. Thus, when open, the hydro-valve 106 allows water to flow from the lower chamber 134 to the upper chamber 132 around the diaphragm 130 and enables water flow to circumvent the diaphragm 130. As shown in FIG. 4, the hydro-valve 106 may be adjacent to the electronics assembly 120, and in some embodiments, is attached or coupled to the electronics assembly 120. This allows the hydro-valve 106 to be controlled through the electronics assembly 120. The hydro-valve 106 may comprise a ball valve 146. As shown in FIG. 4, the ball valve 146 may have a moveable ball 148 and an upper chamber inlet port 147. The moveable ball 148 is sized and shaped to cover and seal the upper chamber inlet port 147. When the ball 148 covers and seals the upper chamber inlet port 147, the ball valve 146 is closed and when the ball 148 is removed from the upper chamber inlet port 147, the ball valve 146 is open. When the ball valve 146 is closed, water is prevented from freely flowing through the hydro-valve 106. This decreases the water pressure within the upper chamber 132, allowing water pressure within the lower chamber 134 to move the piston 136 into the upper position. On the other hand, when the ball valve 146 is open, water is able to flow through the hydro-valve 106. This decreases the difference between the water pressure within the upper chamber 132 and the water pressure within the lower chamber 134 allows the piston 136 to move into the lower position. In this way, the ball valve 146 controls the position of the piston 136. In other words, the position of the piston 136 is responsive to the ball valve 146. The controller valve 100 may also have a screen 149 positioned to filter the water that passes from the lower chamber 134 to the hydro-valve 106, as shown in FIG. 4. This decreases the volume of debris passing through the ball valve 146 and helps limit clogging of the ball valve 146. Additionally, the screen 149 collects the debris in a location that is easily accessed and cleaned by detaching the electronics assembly 120 from the valve body 102.

Figure 9A:
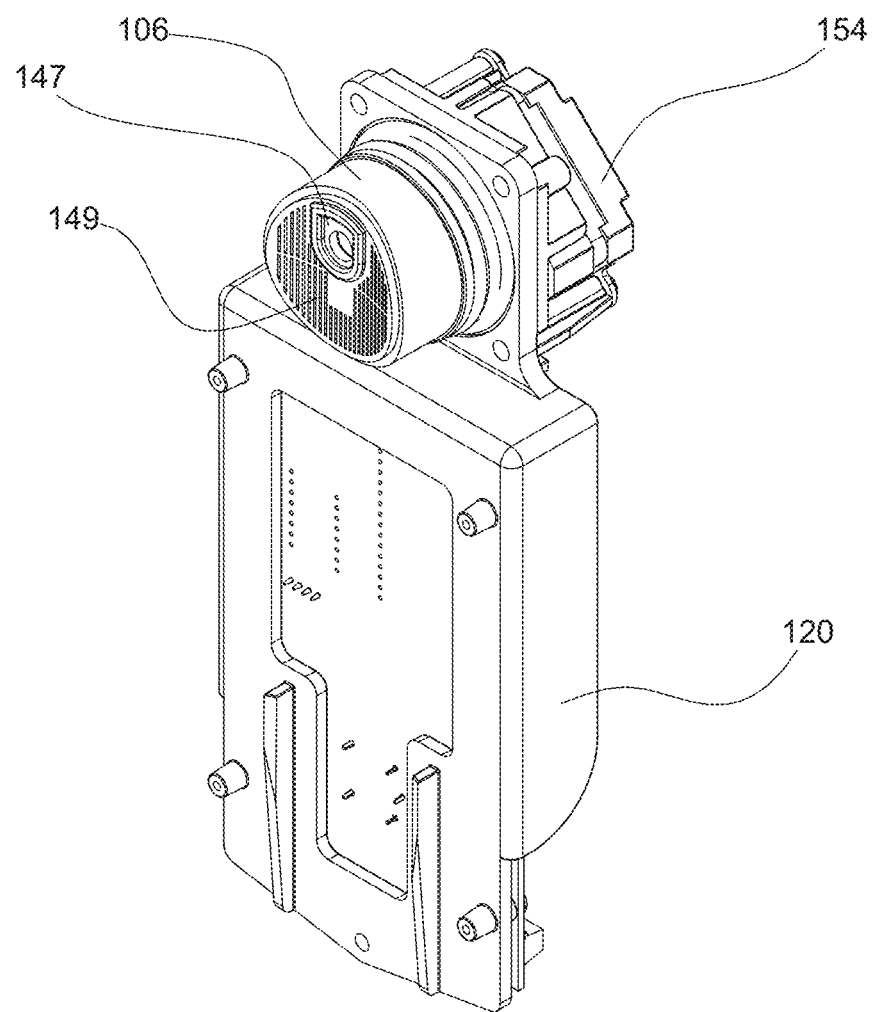
FIG. 9A is a rear perspective view of the hydro-valve assembly of the controller valve shown in FIG. 1.
Figure 9B:
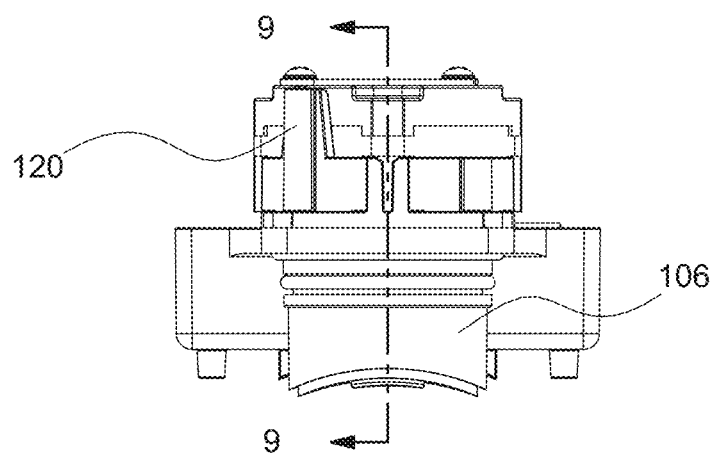
FIG. 9B is a top view of the hydro-valve assembly shown in FIG. 9A.
Figure 9C:
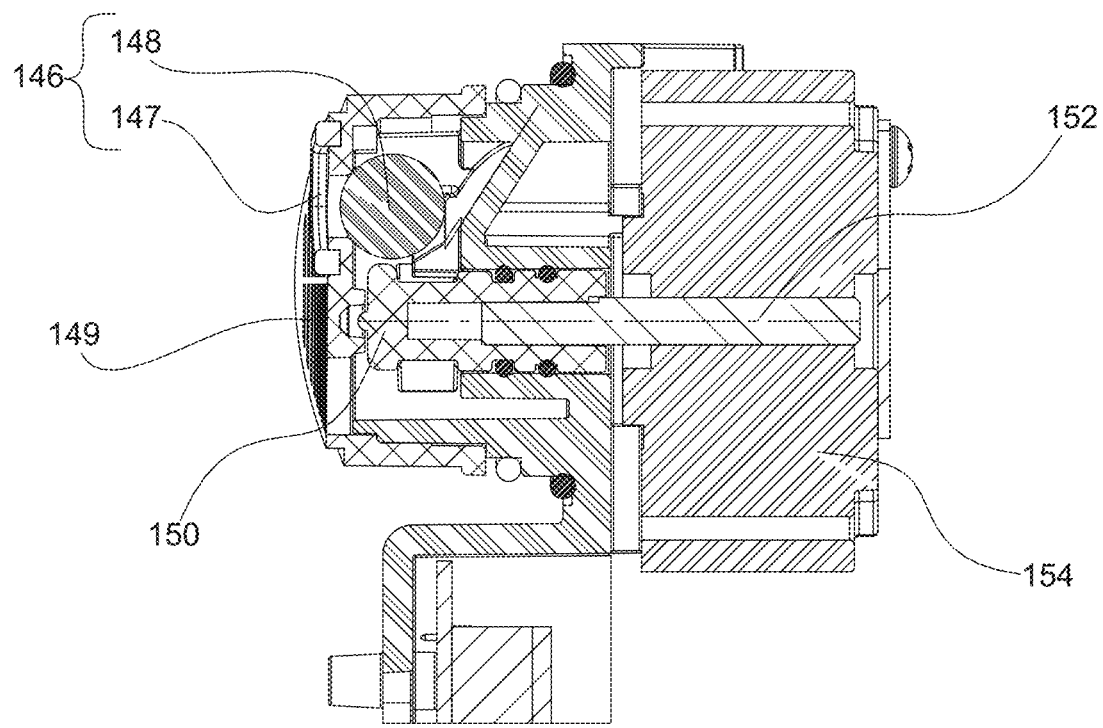
FIG. 9C is a cross-section view of the hydro-valve taken from line 9-9 in FIG. 9B, with the cam in the closed position and the ball covering the upper chamber inlet port.
Figure 9D:
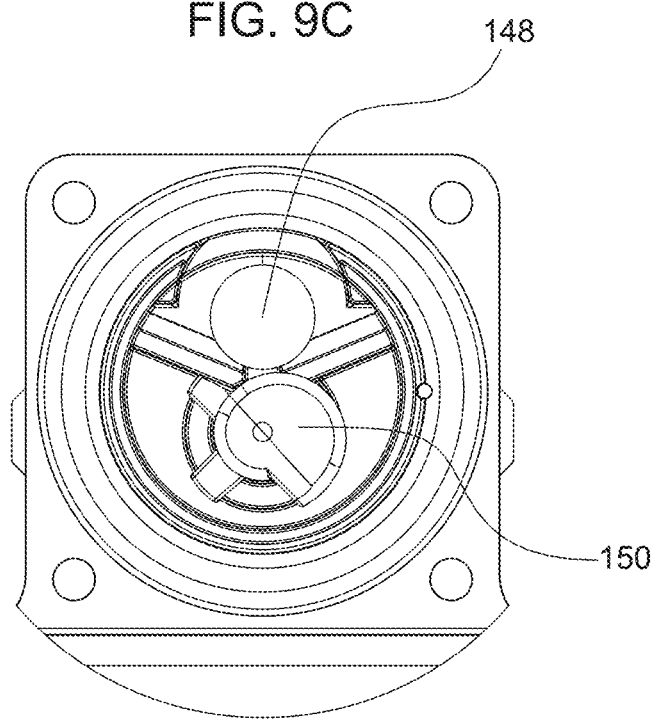
FIG. 9D is an end view of the hydro-valve with the screen removed to show the cam and ball when the cam is in the closed position.

Some embodiments of the controller valve 100 also comprise a cam 150 positioned adjacent to the hydro-valve 106. The cam 150 has an axis 152 about which the cam 150 can rotate. The cam 150 is rotatably coupled to a motor 154 along the axis 152 of the cam 150. The motor 154 is electrically coupled to the electronics assembly 120 and may be controlled remotely or manually through the electronics assembly 120. The cam 150 has a radius that varies around a perimeter of the cam 150 (see FIGS. 9D and 9F). In some embodiments, the radius gradually increases around the perimeter of the cam 150. This varying radius allows the cam 150 to rotate between an open position (FIG. 9F) and a closed position (FIG. 9D) to extend and retract the cam 150 in front of the upper chamber inlet port 147. This may help the cam 150 to apply a leverage force that gradually increases as the cam 150 rotates. Such a gradually increasing leverage force may be more effective at removing the ball 148 from the upper chamber inlet port 147 than a sudden force would. Similarly, less power is required to rotate the cam 150 than would be required to engage a mechanism that could push the ball 146 off of the upper chamber inlet port 147.

Figure 9E:
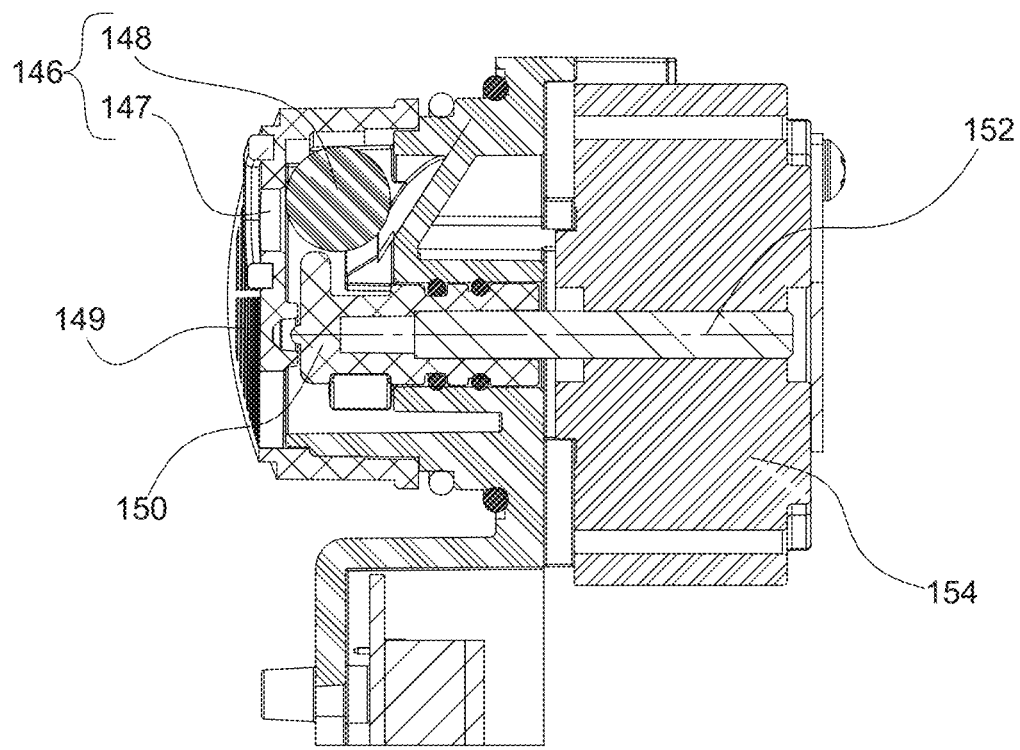
FIG. 9E is a cross-section view of the hydro-valve taken from line 9-9 in FIG. 9B, with the cam in the open position and the ball removed from covering the upper chamber inlet port.
Figure 9F:
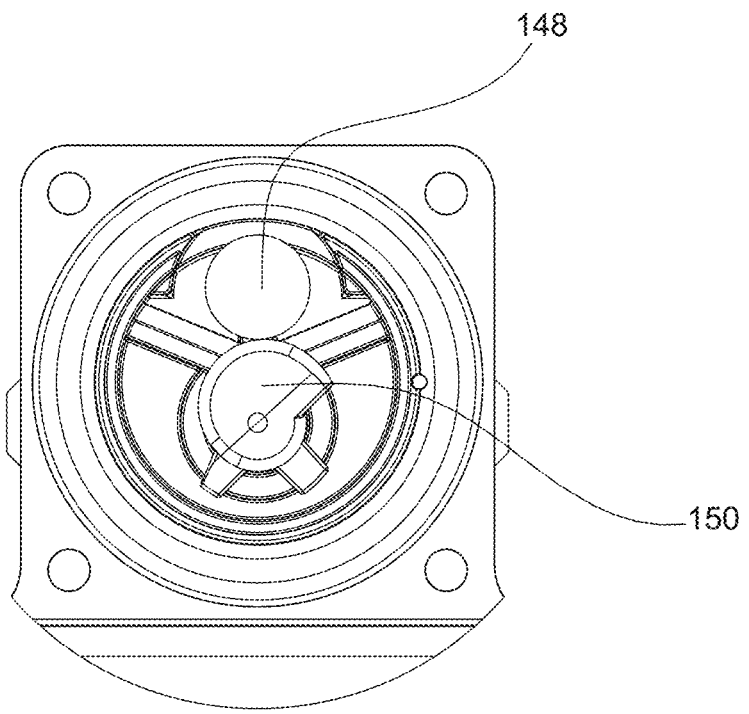
FIG. 9F is an end view of the hydro-valve with the screen removed to show the cam and ball when the cam is in the open position.

FIGS. 9A-9F provide additional views of the hydro-valve 106, the ball valve 146, the upper chamber inlet port 147, the ball 148, and the cam 150 as the cam 150 is moved between the closed position (see FIGS. 9C-9D) and the open position (see FIGS. 9E-9F). When the cam 150 extends in front of the upper chamber inlet port 147 in the open position, the cam 150 displaces the ball 148 from the upper chamber inlet port 147. In contrast, when the cam 150 is rotated and thus retracted from its position in front of the upper chamber inlet port 147, the cam 150 allows the ball 148 to cover and seal the upper chamber inlet port 147. Other mechanisms may also be used to control the position of the ball 148, such as a lever arm or a solenoid. Gravity may help to position the ball 148 to cover the upper chamber inlet port 147 when the cam 150 is moved to the closed position. Additionally, the pressure difference between the lower chamber 134 and the upper chamber 132 may suck the ball 148 into the position covering the upper chamber inlet port 147.

Figure 5D:
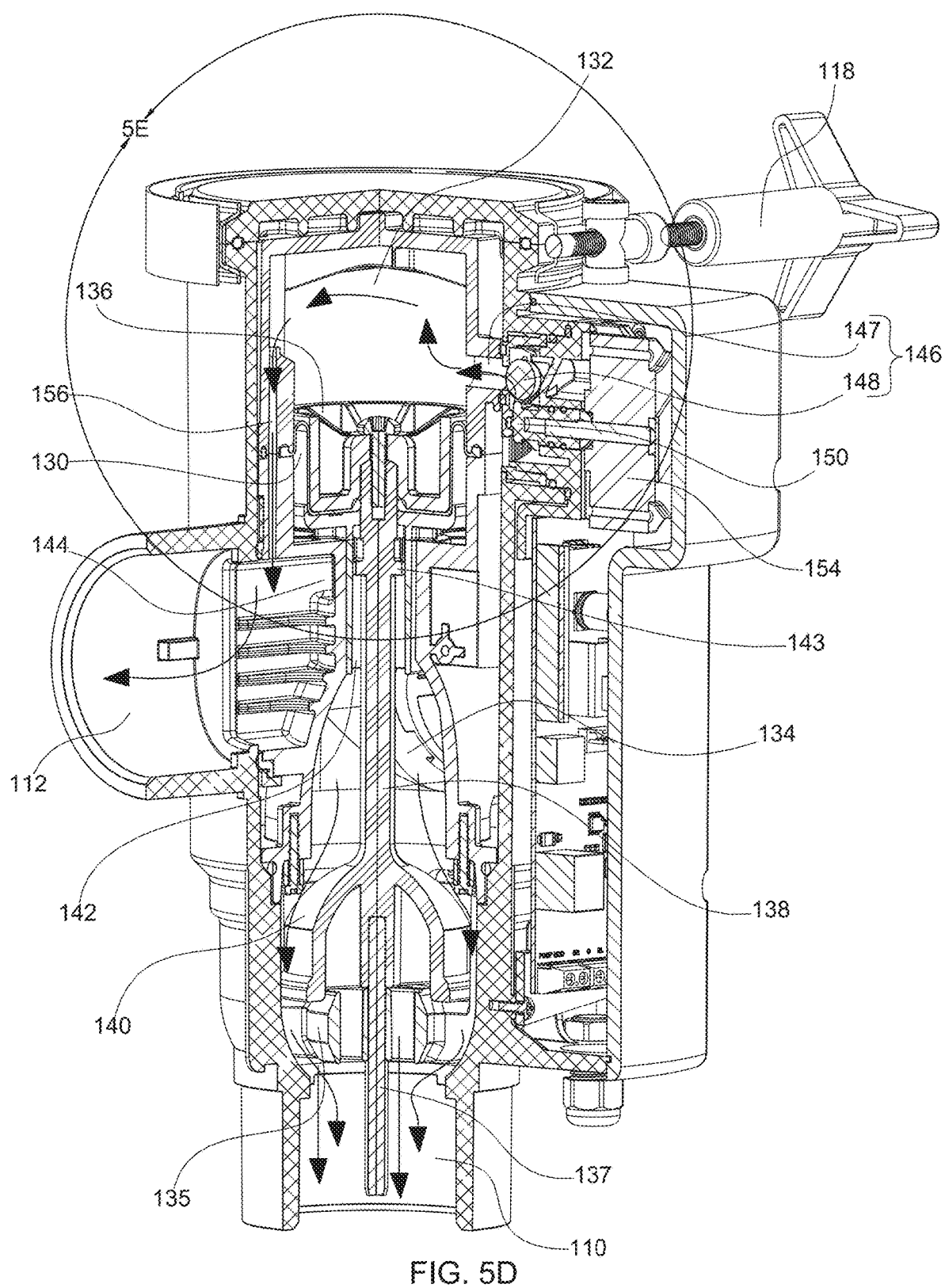
FIG. 5D is the cross-section view of the controller valve shown in FIG. 5B with arrows showing the flow of water through the controller valve.
Figure 5E:
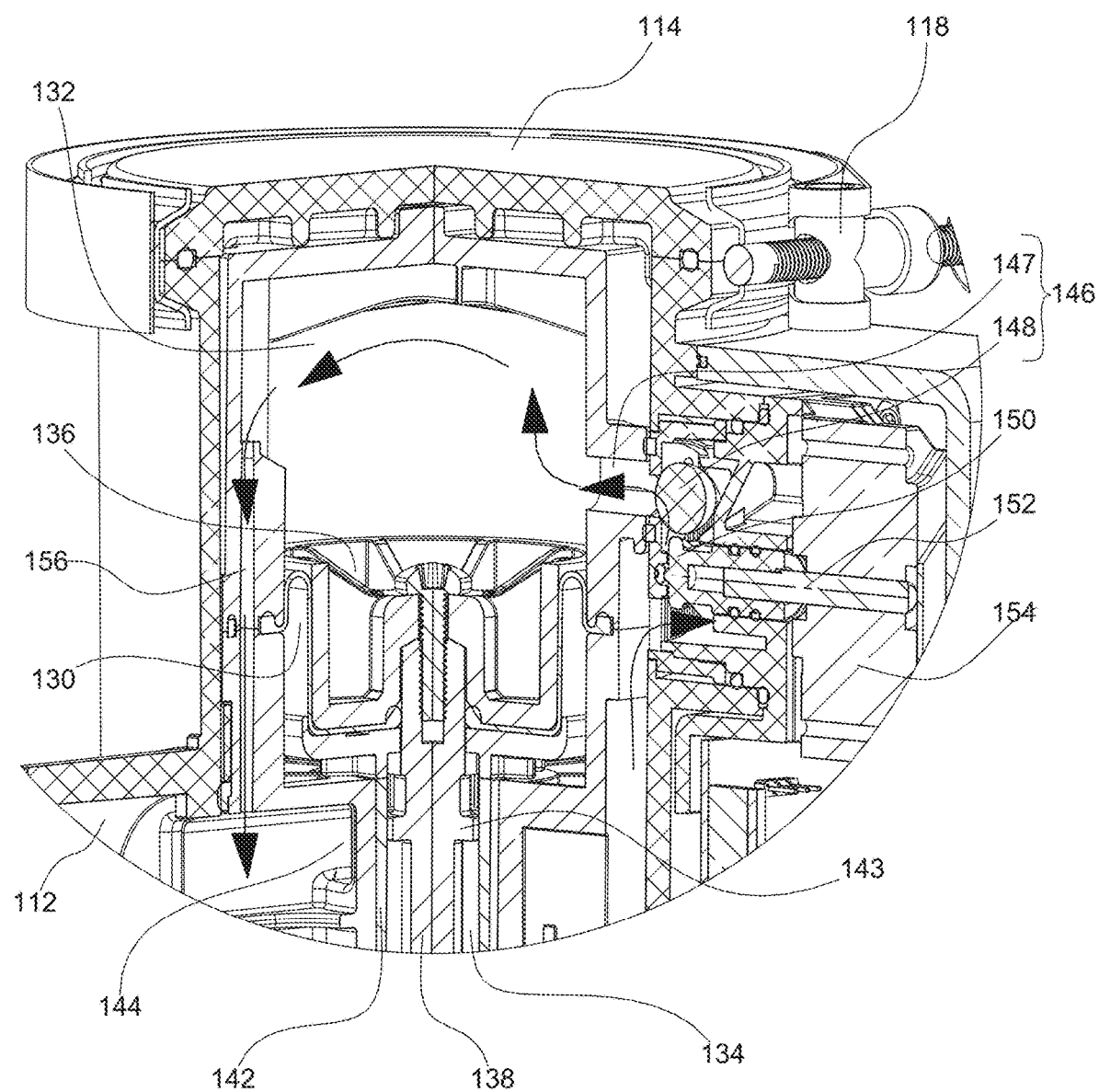
FIG. 5E is a close-up view of the controller valve taken from circle 5E shown in FIG. 5D.
Figure 6A:
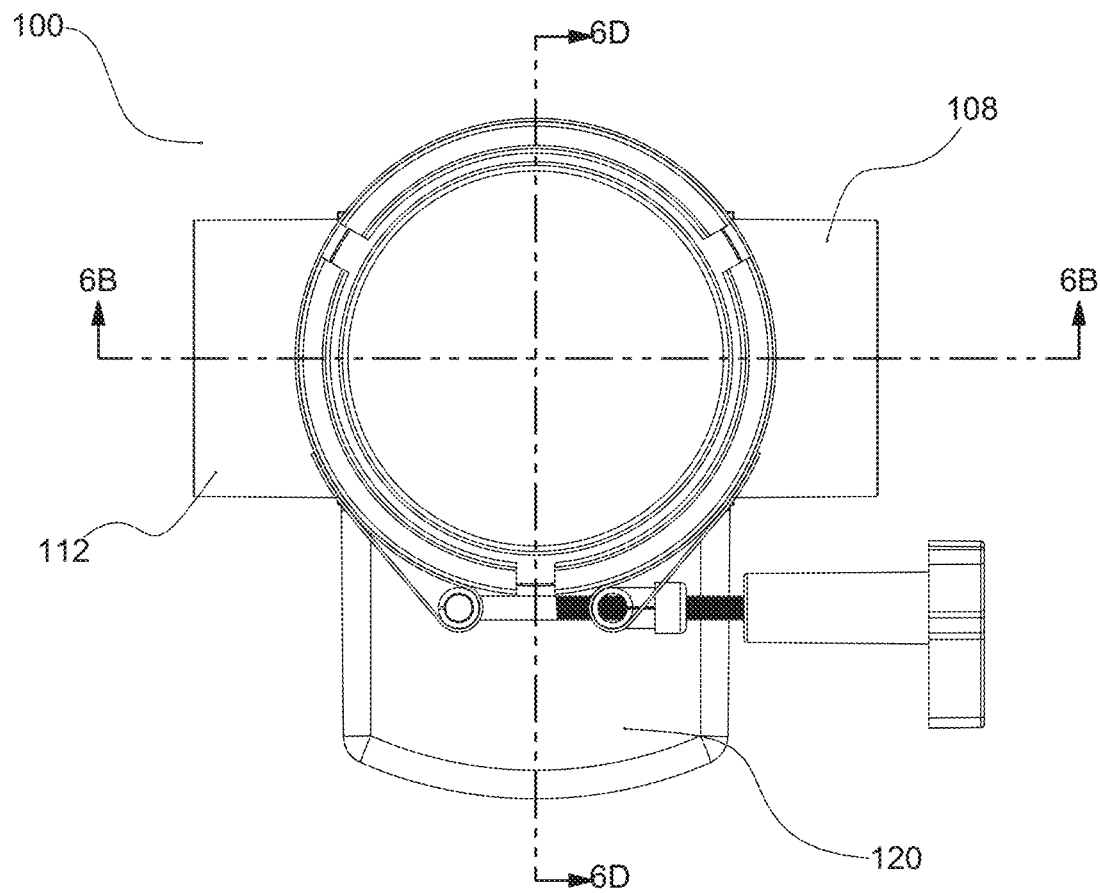
FIG. 6A is another top view of the controller valve shown in FIG. 1.
Figure 6B:
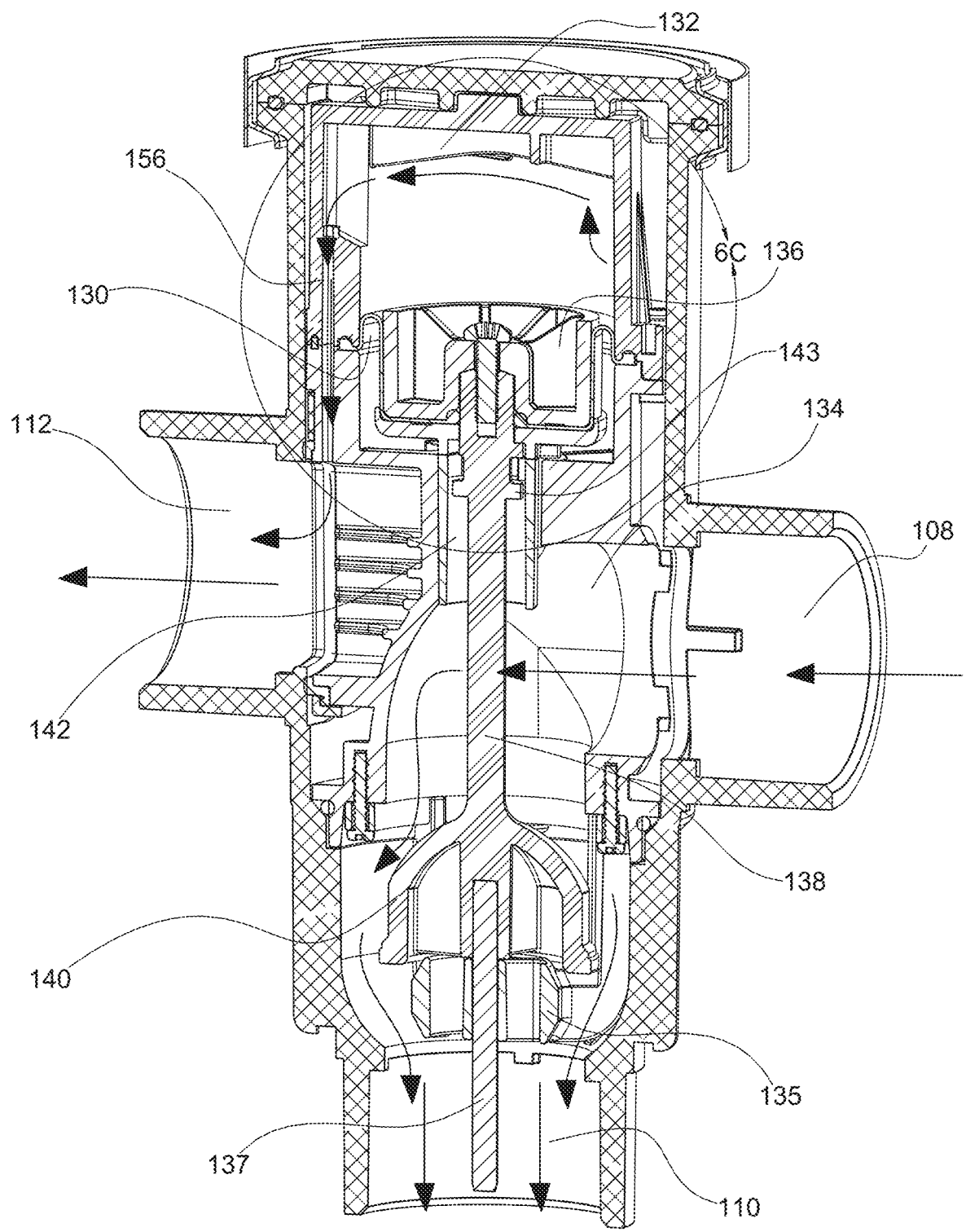
FIG. 6B is a cross-section view of the controller valve taken from line 6B-6B shown in FIG. 6A, with arrows showing the flow of water through the controller valve with the piston in the lower position.
Figure 6C:
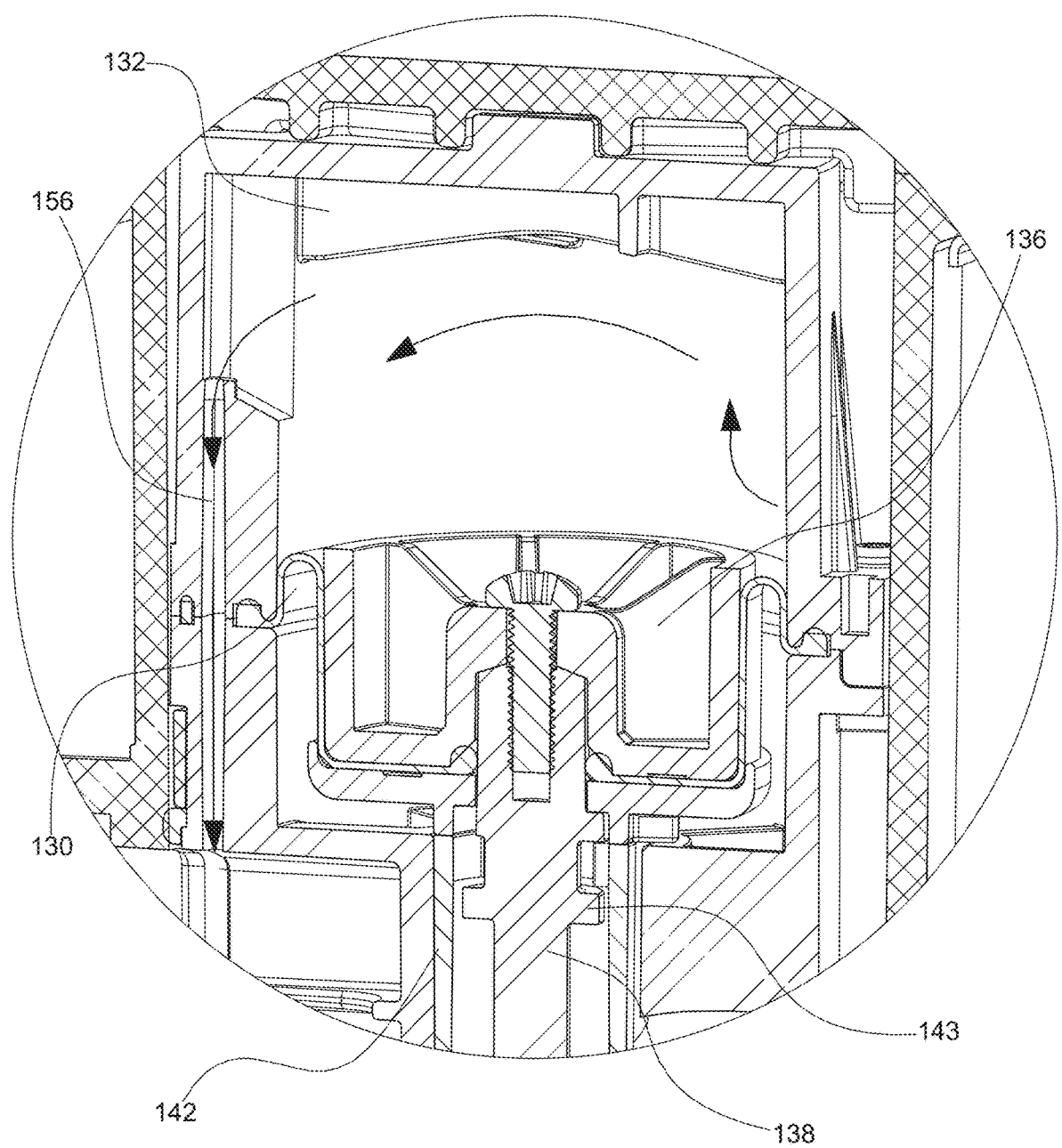
FIG. 6C is a close-up view of the controller valve taken from the circle 6C shown in FIG. 6B.
Figure 6D:
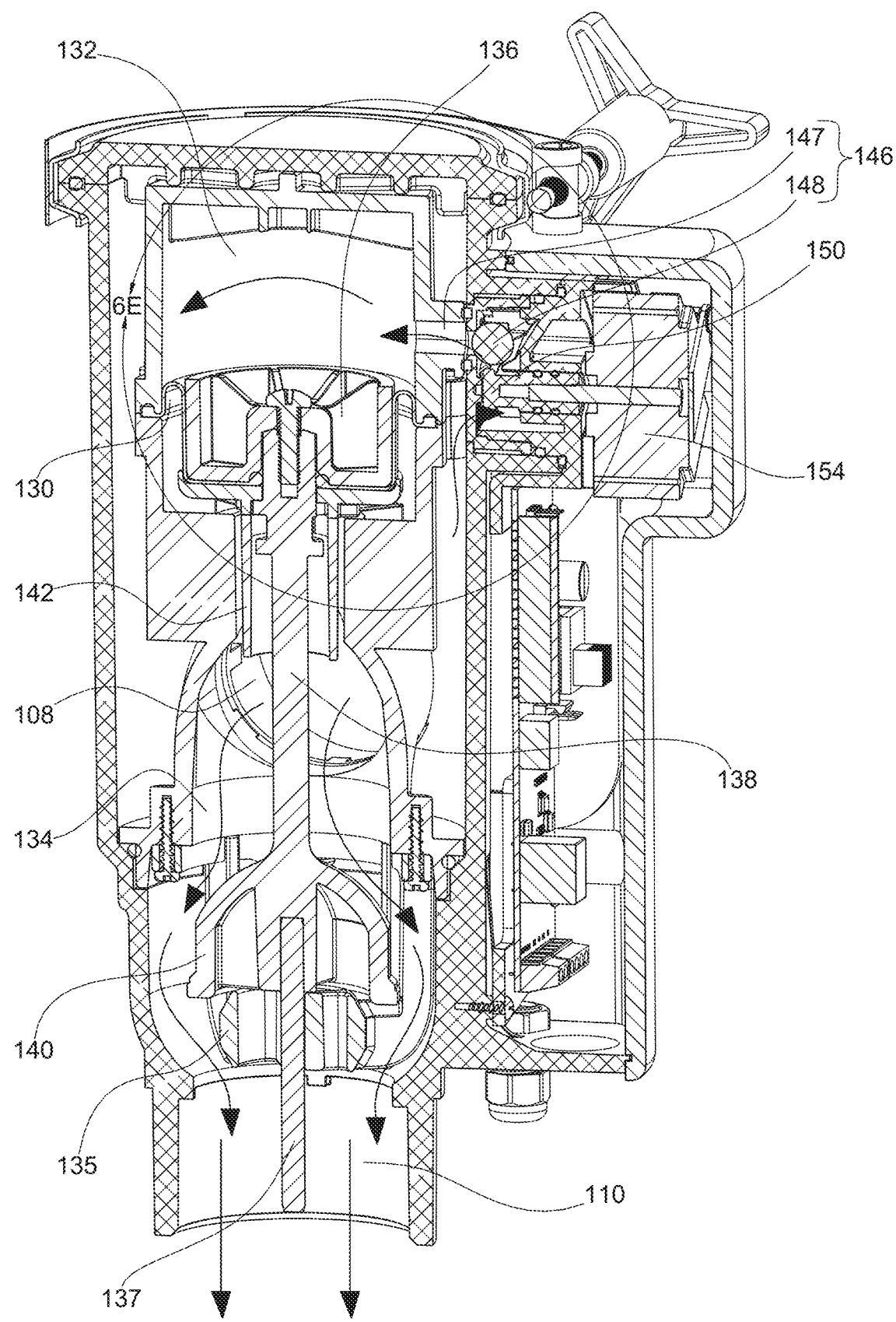
FIG. 6D is a cross-section view of the controller valve taken from line 6D-6D shown in FIG. 6A, with arrows showing the flow of water through the controller valve with the piston in the lower position.
Figure 6E:
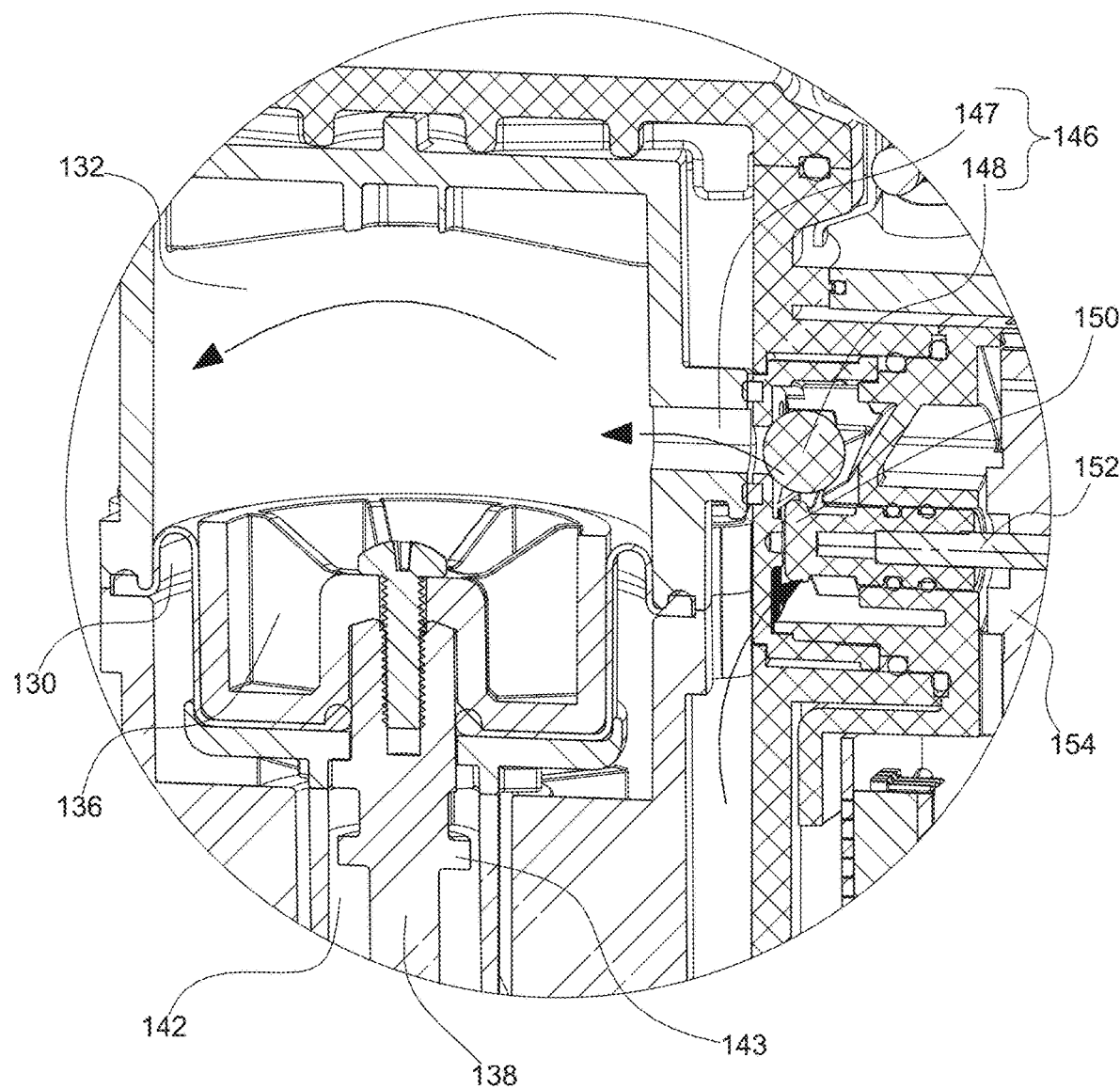
FIG. 6E is a close-up view of the controller valve taken from the circle 6E shown in FIG. 6D.

FIGS. 5A-5E and 6A-6E illustrate the interior of the controller valve 100 when the piston 136 is in the lower position. As can be seen in more detail in FIG. 5C, the piston 136 moves to the lower position when the cam 150 is in the open position. As explained briefly above, when the cam 150 is in the open position and water is supplied through the water inlet, the cam 150 holds the ball 148 away from the upper chamber inlet port 147, keeping the hydro-valve 106 open. As shown in FIGS. 5D and 5E, this allows water to flow through the hydro-valve 106 into the upper chamber 132 of the valve cartridge 104. The flow of water to the upper chamber 132 decreases the difference in pressure, or pressure differential, between the upper chamber 132 and the lower chamber 134, allowing the diaphragm 130 to move towards the lower chamber 134 as described above. This moves the piston 136 into the lower position and causes the plunger 140 to unplug the primary water outlet 110 and allows water to flow through the primary water outlet 110. Additionally, with the piston 136 in the lower position, the bypass gate 142 covers the bypass opening 144, thus limiting water flow through the bypass opening 144 and the bypass water outlet 112.

Also shown in FIGS. 5D-5E and 6B-6E, a bleed line 156 may fluidly couple the upper chamber 132 to the bypass water outlet 112. The bleed line 156 allows the upper chamber 132 to vent to the lower pressure within the bypass water outlet 112, and therefore allows water to flow out of or to drain from the upper chamber 132 when water is present in the upper chamber 132. This allows the pump 14 to operate at a lower operating pressure because a lower pressure differential can be maintained across the water inlet 108 and the primary water outlet 110. Typically, a high pressure differential is required between the inlet and the outlet to make the valve operational. In the controller valve 100, the unique configuration of venting the upper chamber 132 to the bypass water outlet 112 through the bleed line 156 allows substantially less operational pressure loss within the water stream, resulting in much higher water flow capacity at much less motor horsepower. This decreases the strain on the pool cleaning system 10 and the equipment involved, including the pump 14. In particular embodiments, the pressure loss required over the controller valve 100 is less than 2 lbs., and in more specific systems, the pressure loss required is around 1 lb. of pressure or less. This is possible because the system 10 always has a consistent low pressure reference point.

When the hydro-valve 106 is open, pressure within the upper chamber 132 increases because the flow of water into the upper chamber 132 is greater than the flow of water through the bleed line 156. However, once the hydro-valve 106 is closed, water continues to flow through the bleed line 156, thus decreasing the pressure in the upper chamber 132. In this way, the pressure differential between the lower chamber 134 and the upper chamber 132 increases and the piston rises to the upper position. The bleed line 156 may vent to the bypass water outlet 112 at a point downstream from the bypass opening 144 such that water flow through the bleed line 156 is possible regardless of whether the bypass gate 142 is open or closed. The bleed line 156 may have a diameter that is approximately 3/32 inches. In some embodiments, the diameter of the bleed line 156 is less than or equal to 1/8 inches.

Figure 7D:
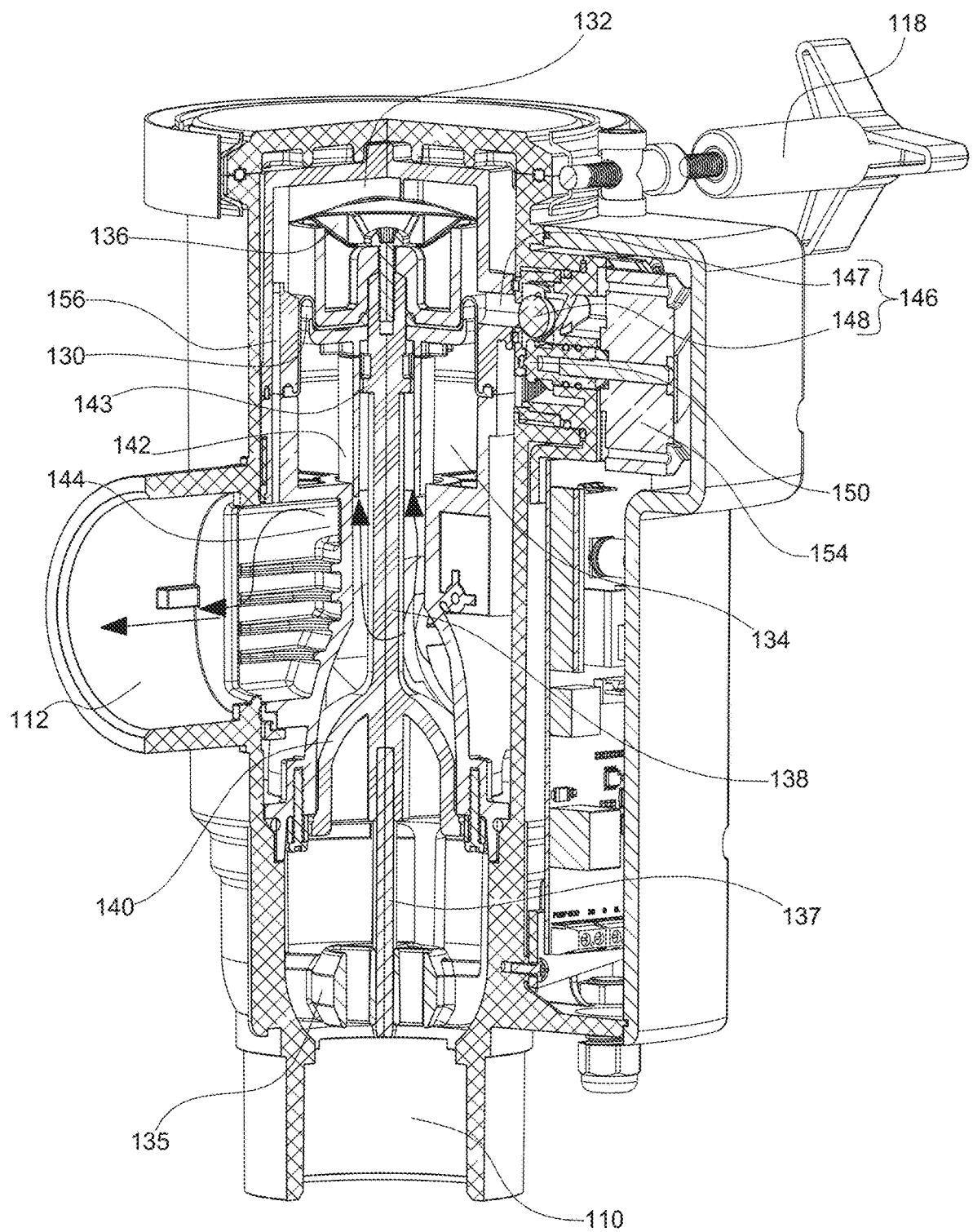
FIG. 7D is the cross-section view of the controller valve shown in FIG. 7B with arrows showing the flow of water through the controller valve.
Figure 8A:
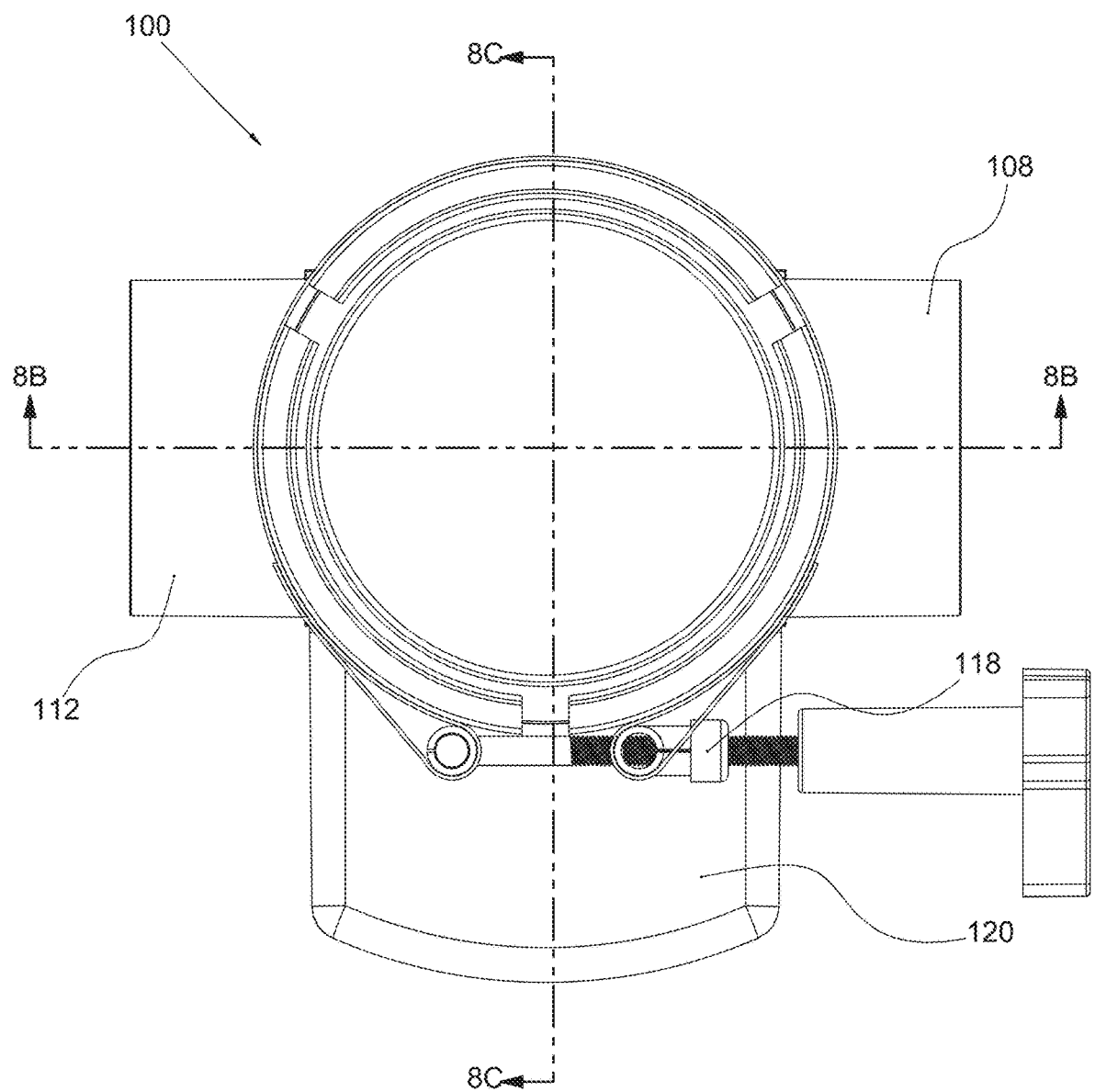
FIG. 8A is a top view of the controller valve shown in FIG. 1.
Figure 8B:
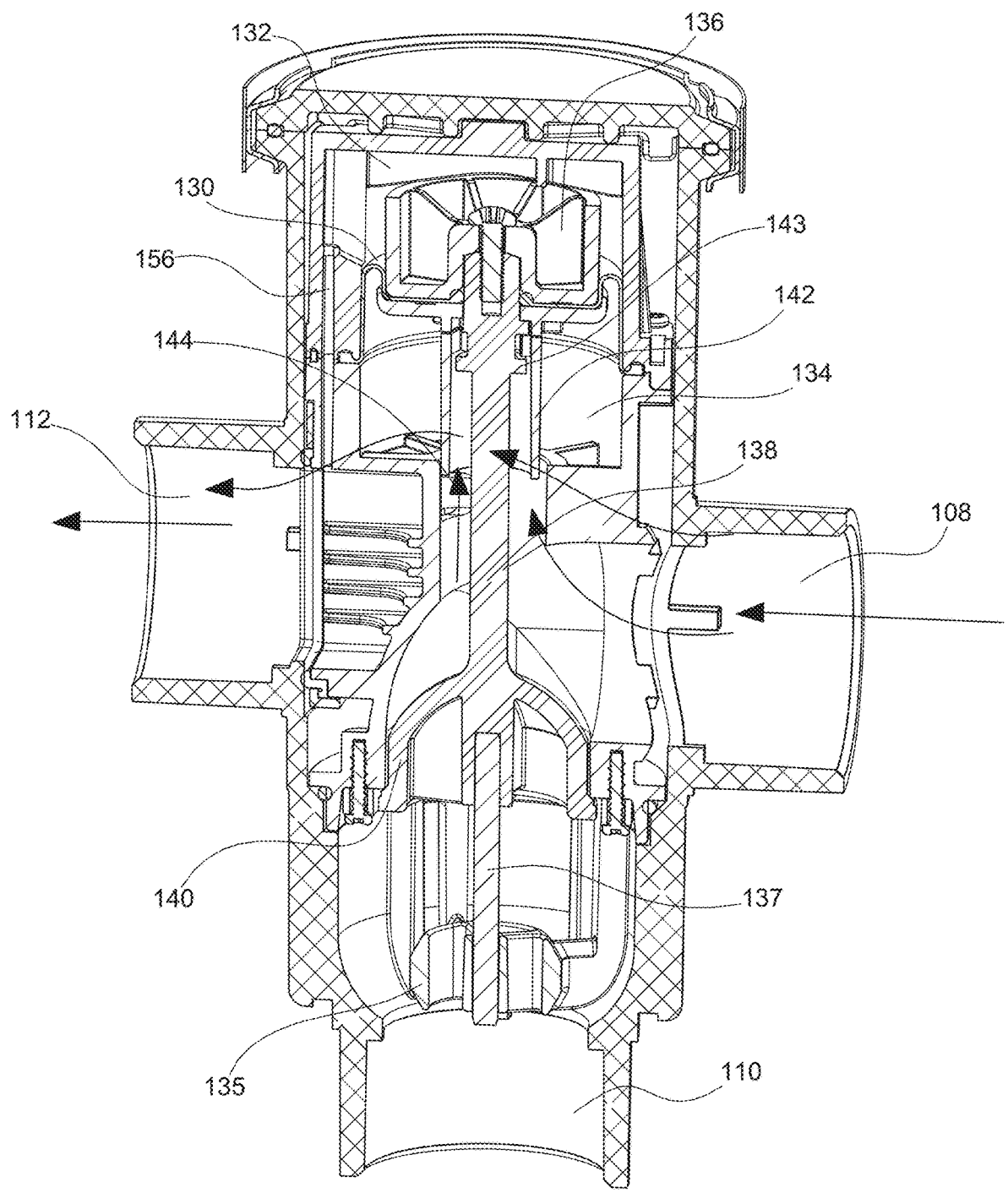
FIG. 8B is a cross-section view of the controller valve taken from line 8B-8B shown in FIG. 8A, with arrows showing the flow of water through the controller valve with the piston in the upper position.
Figure 8C:
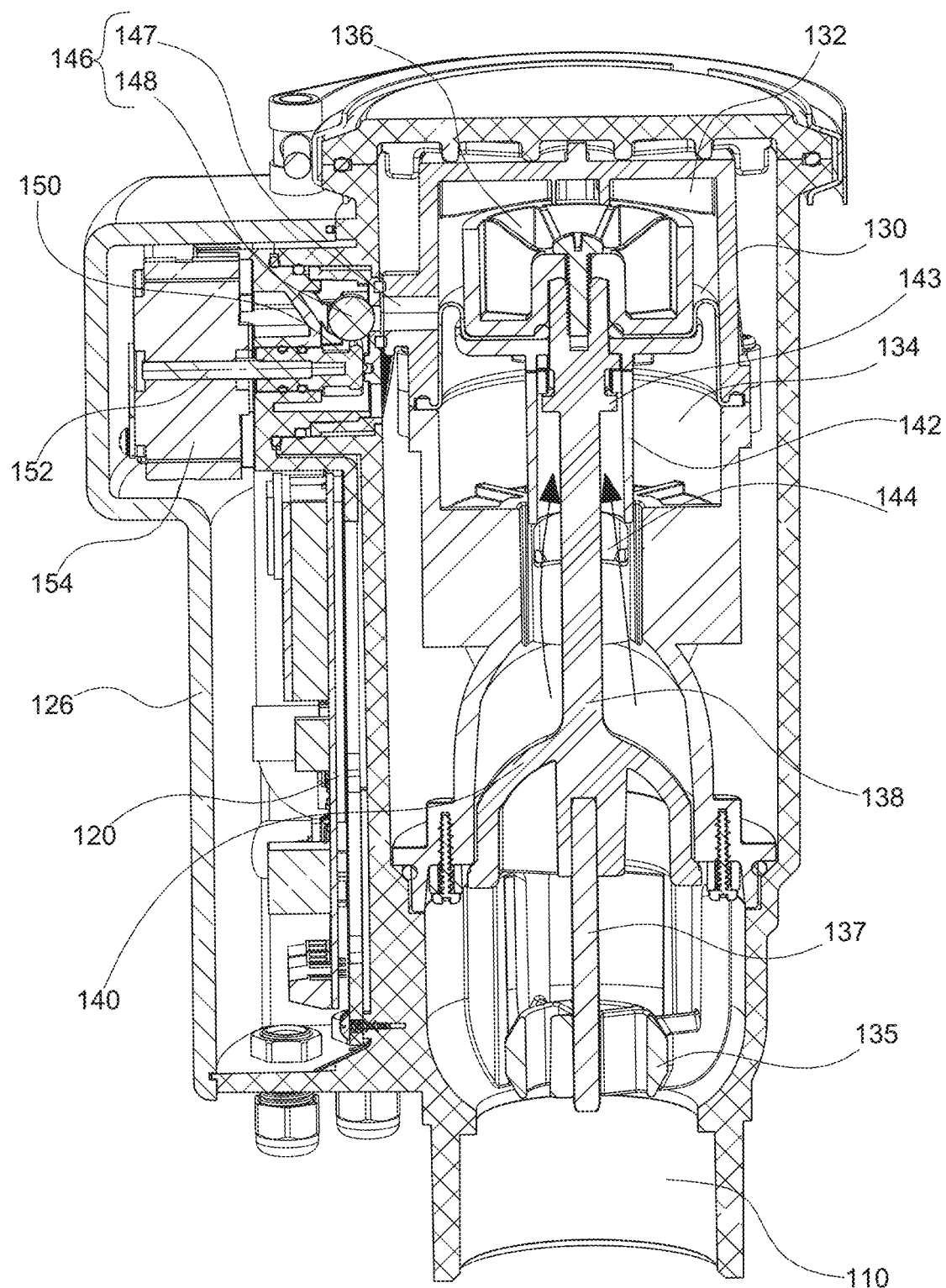
FIG. 8C is a cross-section view of the controller valve taken from line 8C-8C shown in FIG. 8A, with arrows showing the flow of water through the controller valve with the piston in the upper position.

FIGS. 7A-7D and 8A-8C illustrate the interior of the controller valve 100 when the piston 136 is in the upper position. As can be seen in more detail in FIG. 7C, the piston 136 moves to the upper position when the cam 150 is in the closed position. As explained briefly above, when the cam 150 is in the closed position and water is supplied through the water inlet, the ball 148 is able to cover and seal the upper chamber inlet port 147, limiting water flow through the hydro-valve 106. As shown in FIGS. 7D, 8B, and 8C, this causes the pressure differential between the lower chamber 134 and the upper chamber 132 to increase as water drains from the upper chamber 132 through the bleed line 156 and moves the diaphragm 130 toward the upper chamber 132 as described above. This moves the piston 136 into the upper position and causes the plunger 140 to plug the primary water outlet 110, limiting water flow through the primary water outlet 110. With the piston 136 in the upper position, the bypass gate 142 is removed from covering the bypass opening 144, allowing water flow through the bypass opening 144 and the bypass water outlet 112.

As should be clear from this disclosure, water flow through the upper chamber 132 and the lower chamber 134 varies as the cam 150 moves between the open position and the closed position and the piston 136 moves between the upper position and the lower position. Thus, the amount of water in the upper chamber 132 and the amount of water in the lower chamber 134 during use of the controller valve 100, along with the volume of the upper chamber 132 and the volume of the lower chamber 134, are variable over time.

In operation, the controller valve 100 enables a user to exert greater control on the pool cleaning system 10. For example, the controller valve 100 used in conjunction with the distribution valves 12 taught by the Goettl patent applications mentioned above allows the pool cleaning system 10 to select which zones to run, the order of the zones, and the duration of each zone for a more effective cleaning cycle. For example, in embodiments of the pool cleaning system 10 that have distribution valves 12 capable of pausing on a specific zone, one or more water cycles can be introduced into a single zone, which allows a predefined and programmable quantity of cycles and a predefined and programmable amount of run-time duration for each cycle. By controlling these control valve elements, all operational functions of a single or plurality of in-floor cleaning nozzles 16 may be controlled for all cycles of a cleaning nozzle 16, which may cause a particular action for the single or plurality of in-floor cleaning nozzles 16 including both raising and lowering the nozzle 16, and initiating the rotational movements of a nozzle 16. By controlling these functions within the system, an in-floor system may be configured to stay at a particular cleaning zone and complete all of the cleaning operations for that zone including performing a predetermined, unlimited number of cycles of a cleaning head with an unlimited number of adjustable durations of water flow between the cycles. This modification effectively allows a system to be programmed to clean a pool zone-by-zone, and strategically move debris from the furthest point away from the drain, systematically and intelligently toward the debris collection zone and drain. This is different from conventional systems that operate cleaning heads in a single position per cycle and then move to the next circuit and cycle through all circuits before coming back to the first cleaning head circuit to operate the cleaning heads to a second position and second cycle.

Another benefit of the controller valve 100 is that it helps to preserve equipment and system integrity. Occasionally, when a pool valve malfunctions, it can cause a pool pump to deadhead, or continue running without water running through the system because a valve gets stuck closed. Running the pump without water causes it to overheat and damage the equipment. Because the controller valve 100 always has a water path through it, either through the primary water outlet 110 or the bypass water outlet 112, the controller valve 100 maintains the equality of pressure for the system 10, and the system 10 sees constant water flow, limiting deadheading of the pool pump 14 if the controller valve 100 malfunctions. If the controller valve 100 gets stuck with the piston 136 in the lower position, water will flow through the primary water outlet 110. If the controller valve 100 gets stuck with the piston 136 in the upper position, water will flow through the bypass water outlet 112.

When using the controller valve 100, water cycles are infinitely adjustable for quantity and duration. By controlling the quantity of cycles, the positional movement of subsequent distribution valves 12 can be controlled. By controlling the duration of particular cycles, the reach performance of the cleaning nozzles 16 can be modified. The longer a water stream is operated in a given position before the water pressure ceases and the cleaning head starts a new cycle, the longer the reach of the effective cleaning distance is affected. By enabling the distribution valve 12 to remain within a particular cycle for a longer duration, the reach of a cleaning head can be controlled to fine tune the cleaning system for a given pool.

Additionally, by allowing an amount of water to go through the bypass water outlet 112 rather than shutting off the valve to trigger a cycle change and resulting cleaning head positional change, there is minimal variation of system pressure and the primary pump 14 remains pumping without shutting it off. System pressure variations caused by turning off a pump on a particular set of cleaning heads during a conventional cycling process can cause adverse and often damaging effects on the system hardware through water hammer, varied flow to other system components or rapid variations of pressure difference in the system pump. Providing a similar pressure drop for the in-floor valve, piping and nozzle by passing some water to the bypass, without cycling the pump, is preferable because there is a minimal variation of system pressure despite the cleaning heads having sufficient pressure drop to change. The controller valve 100 may therefore be used to control the beginning and cessation of water flow to a pool cleaning system zone or multiport valve by diverting the water rather than turning the pump 14 on and off.

The controller valve 100 described contains control logic that can communicate remotely with an independent device, such as a phone app, for adjustability of independent zone functions to fine-tune the pool cleaning system 10. This includes the ability to contain complete cleaning programming for all functions of the in-floor cleaning operations. It also includes the ability to communicate commands and information, and coordinate functions between the controller valve 100 and a single or plurality of multiport zone distribution valves 12. An in-floor controller valve 100 can send and receive data through any wireless, or wired, internal or external Wi-Fi, Bluetooth, or other common networking communication methods known in the art. The system 10 enables control of all run-time duration and all cycles through an initial programming process that can be altered at any time through an external control system, such as a phone application, control board or other electronic method. In particular embodiments, the pool cleaning system 10 may be configured to communicate with a third-party independent control system to provide start, stop and other programmable functions of in-floor operation and coordination with other pool equipment such as fountains, booster pumps, cleaning systems and the like. Additionally, the controller valve 100 may be configured to communicate with a system that reports weather conditions to provide automatic operation of the system in response to the weather conditions, such as wind speed, storms, and the like. Accordingly, a swimming pool cleaning system 10, including its cleaning circuits and cleaning heads, can be provided with an uploadable program optimized for the swimming pool despite the components of the system being primarily water controlled.

This system provides the first truly programmable swimming pool cleaning system 10.

Figure 10:
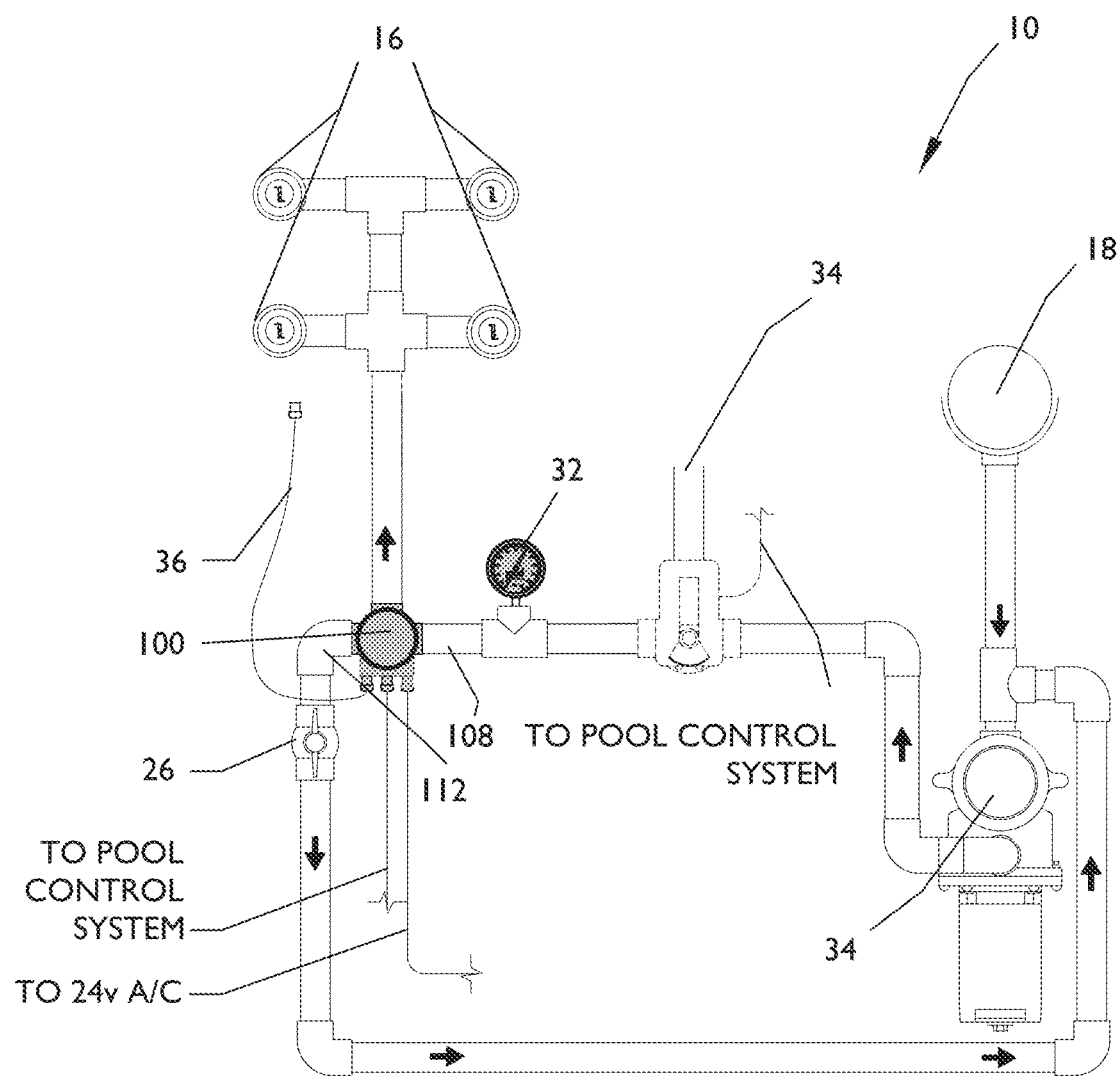
FIG. 10 is a system diagram of the controller valve shown in FIG. 1 incorporated as a controller in a pool cleaning system.
Figure 11:
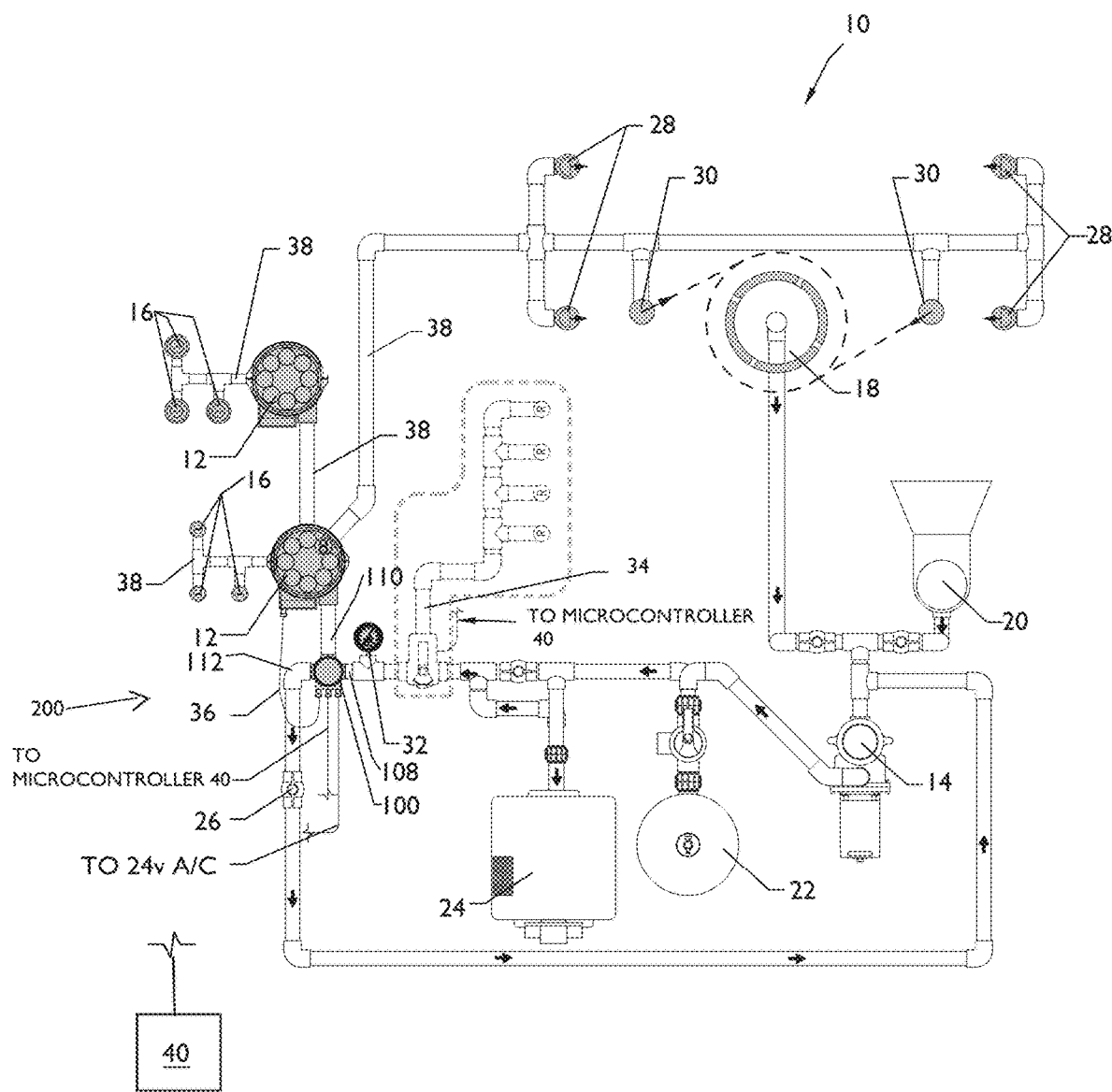
FIG. 11 is a system diagram of the controller valve shown in FIG. 1 incorporated as a controller in a pool cleaning system with multiple valves in series.

FIGS. 10-11 illustrate non-limiting examples of how the controller valve 100 may be implemented with an existing pool cleaning system 10. The pool cleaning system 10 includes the controller valve 100, a pool drain 18, skimmer 20, pump 14, filter 22, optional heater 24, water features, spa systems, a chlorinator (and any other equipment the pool may have), a pressure gauge 32, a pool return line 34, and a primary distribution valve 12 feeding the pool cleaning heads 16. Additional distribution valves 12 may be implemented and may be controlled by the first distribution valve 12, each also feeding pool cleaning heads 16. In addition, for this embodiment, the controller valve 100 is installed to include connection to 24V AC and to the pool control system, and other control wires to interface with the other equipment.

As discussed above, the bypass water outlet 112 of the controller valve 100 may pass the water to a point in the pool cleaning system 10 before the pump 14, as shown in FIGS. 10 and 11. The bypass water outlet 112 may also pass water through a shut off valve 26 that is useful for system blowout. The pool cleaning system 10 may also have additional jets aside from the pool cleaning heads 16. These additional jets are helpful in facilitating the flow of water toward the drain 18. Specifically, the pool cleaning system 10 may have down jets 28 and fixed heads 30 that help direct water in a pattern that facilitates draining through the drain 18, as shown in FIG. 11.

Thus, the pool cleaning system 10 may have a pool control system 200 that comprises the controller valve 100, the distribution valve 12, a plurality of water zones 38, and a microcontroller 40. As discussed above, the controller valve 100 may have a water inlet 108, a primary water outlet 110, a bypass water outlet 112, and a hydro-valve 106. The water inlet 108 is configured to fluidly couple with the water pump 14 and receive water from the pool into the controller valve 100. The primary water outlet 110 and the bypass water outlet 112 are each fluidly coupled to the water inlet 108 and are configured to pass water out of the controller valve 100. The hydro-valve 106 is configured to move between an open position and a closed position. When the hydro-valve 106 is in the open position and water is supplied to the water inlet 108, the water passes from the water inlet 108 to the primary water outlet 110. When the hydro-valve 106 is in the closed position and water is supplied to the water inlet 108, the water passes from the water inlet 108 to the bypass water outlet 112.

Figure 12:
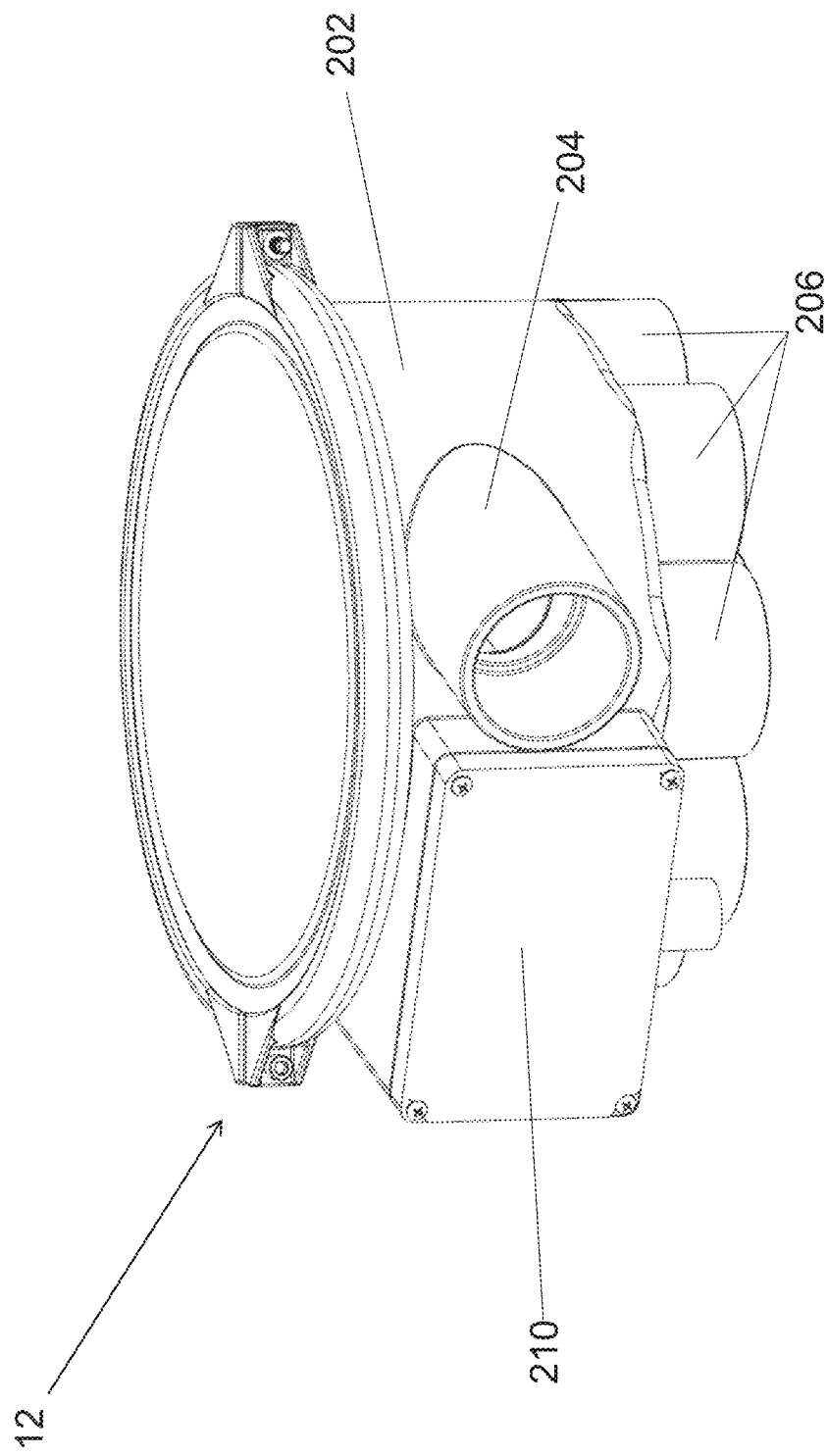
FIG. 12 is a perspective view of a distribution valve.
Figure 13:
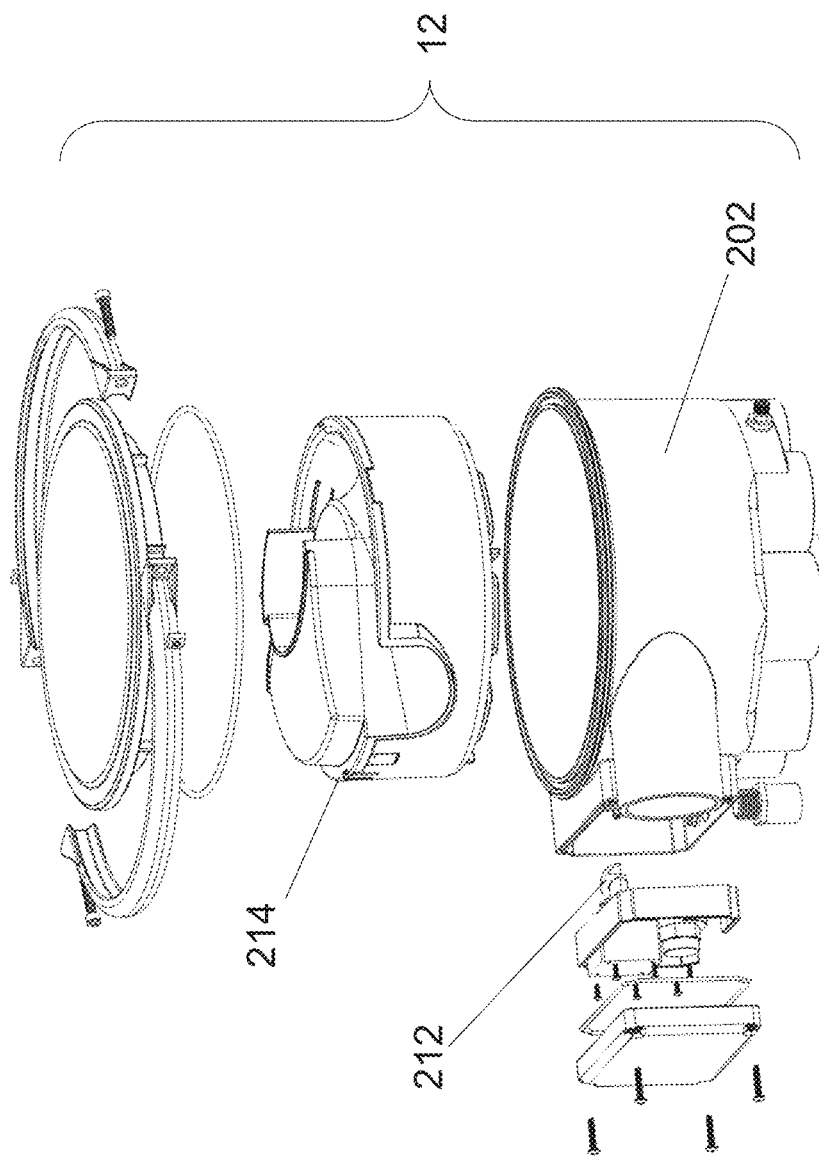
FIG. 13 is an exploded view of the distribution valve shown in FIG. 12.
Figure 14:
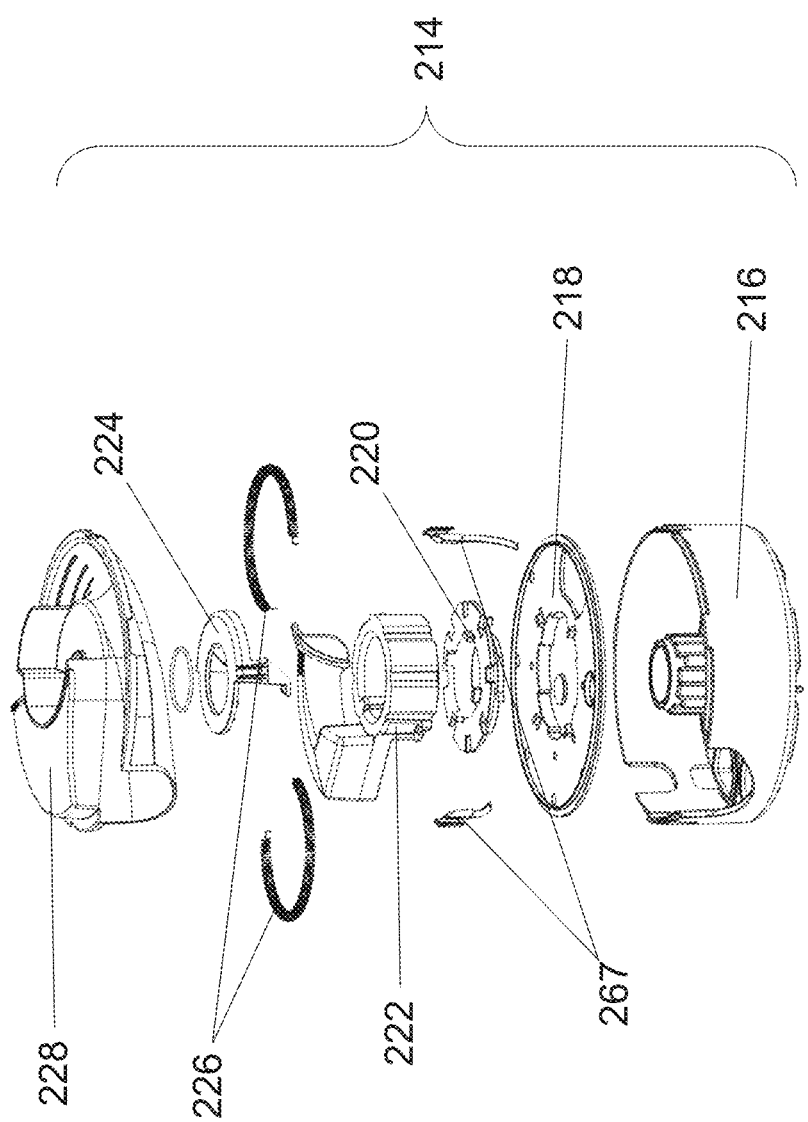
FIG. 14 is an exploded view of the cartridge assembly of the distribution valve shown in FIG. 12.
Figure 15:
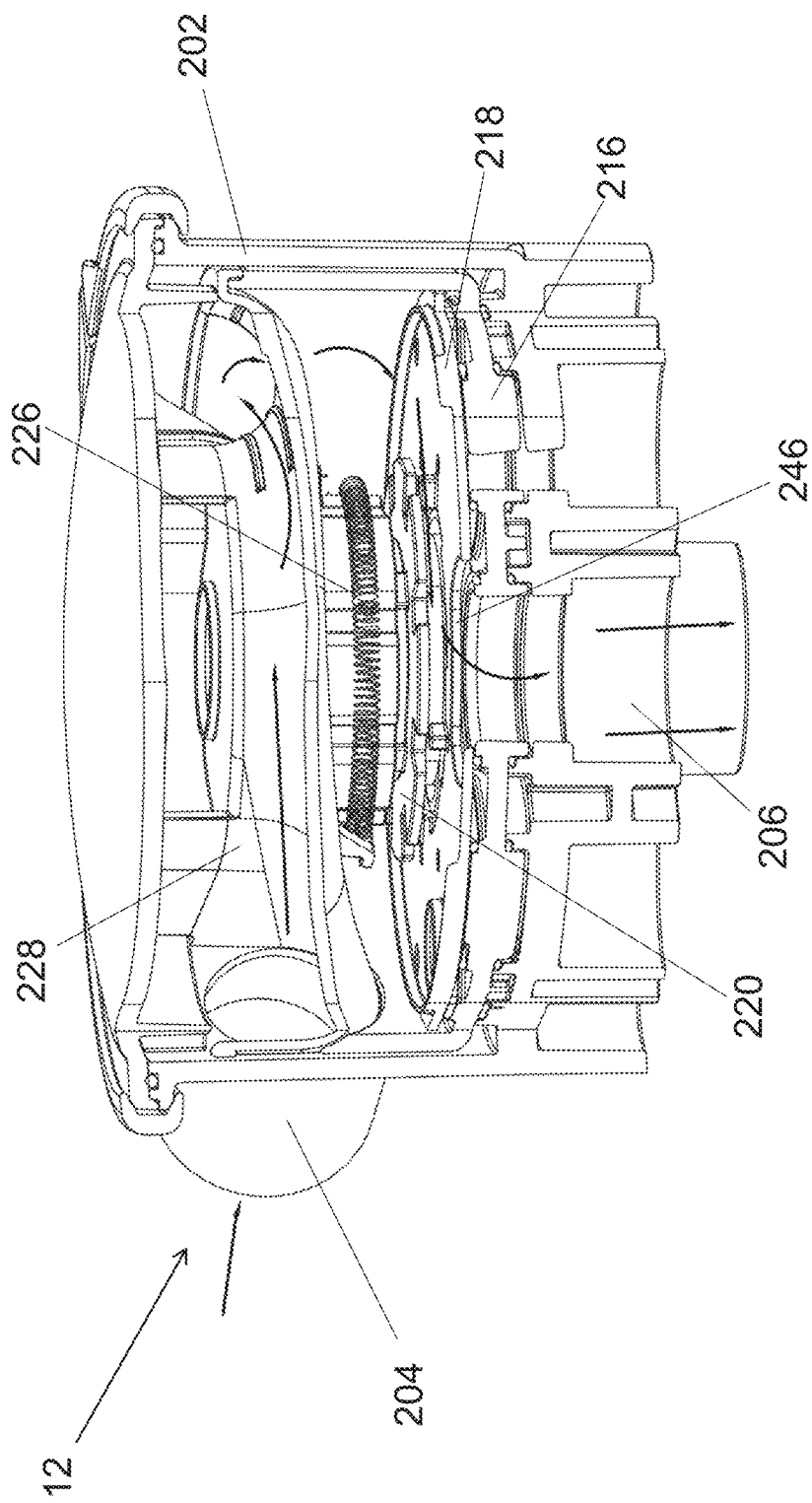
FIG. 15 is a cross section view of the distribution valve shown in FIG. 12.

The distribution valve 12 is disclosed more completely in the Goettl applications referenced and incorporated by reference above. As shown in FIG. 12, the pool cycling valve 12 has a valve body 202 with at least one inlet port 204 and a plurality of outlet ports 206. In addition, the pool cycling valve 12 may have an electronics box 210 extending away from the valve body 202. The electronics box 210 is sized to fit the pausing arm 212 and its necessary components therein, as shown in FIG. 13. Also shown in FIG. 13, a cartridge assembly 214 sits inside of the valve body 202. FIG. 14 illustrates an exploded view of the cartridge assembly 214. The cartridge subassembly 214 may comprise a cartridge body 216, a bottom plate 218, a ratchet body 220, a cup 222, a spring lock 224, a spring 226, pushdown arms 267, and an upper plate 228.

The inlet port 204 may be fluidly coupled to the primary water outlet 110 of the controller valve 100 and may thus receive any water passed through the primary water outlet 110. Within the distribution valve 12, an outlet port aperture 246 is configured to sequentially align with each of the plurality of outlet ports 206. In some embodiments, at any given moment of time, all of the plurality of outlet ports 206 are blocked and do not allow water to flow through the outlet port 206 with the exception of the outlet port 206 that is currently aligned with the outlet port aperture 246. Thus, the flow of water through the distribution valve 12 can be directed to the desired outlet port 206 by controlling the position of the outlet port aperture 246. The outlet port aperture 246 may be positioned on a bottom plate 218 within the distribution valve 12. The outlet port aperture 246 may be configured to align with a new outlet port 206 in response to a change in water flow through the distribution valve 12, which also corresponds with a change in water pressure within the distribution valve 12.

The pausing arm 212 is configured to move between a disengaged position and an engaged position. When the pausing arm 212 is disengaged, the outlet port aperture 246 is configured to align with a new outlet port 206 of the plurality of outlet ports 206 each time the hydro-valve 106 moves from the open position to the closed position as described above. Thus, the position of the hydro-valve 106 helps to determine the position of the outlet port aperture 246 when the pausing arm 212 is disengaged. However, once the pausing arm 212 is in the engaged position, the pausing arm 212 maintains a position of the outlet port aperture 246 regardless of the position of the hydro-valve 106.

The plurality of water zones 38 are each configured to fluidly couple with a respective outlet port 206 of the plurality of outlet ports 206. Thus, when water is supplied to a particular outlet port 206, this supplies the water to the entire water zone 38, which may include pool cleaning heads 16 or other water features such as down jets 28 or fixed heads 30. The microcontroller 40 is configured to intelligently and selectively discharge water from the pool control system 200 to each of the plurality of water zones 38 by controlling the hydro-valve 106 to move the position of the hydro-valve 106 between the open position and the closed position and controlling the pausing arm 212 to move the position of the pausing arm 212 between the disengaged position and the engaged position. By controlling the hydro-valve 106 and/or the pausing arm 212, the microcontroller 40 is able to select where to send water and for how long, along with other customized options. The microcontroller 40 may physically be located anywhere, and is communicatively coupled to the hydro-valve 106 and/or the pausing arm 212.

By controlling the hydro-valve 106, the microcontroller 40 controls the position of the outlet port aperture 246 because the hydro-valve 106 allows the microcontroller 40 to change the water flow to the distribution valve 12, and therefore change the water pressure within the distribution valve 12. As mentioned above, the outlet port aperture 246 may be configured to align with a new outlet port 206 in response to this change. By controlling the pausing arm 212, the microcontroller 40 controls the position of the outlet port aperture 246 by locking the outlet port aperture 246 in place despite changes in water flow through and water pressure within the distribution valve 12. This becomes especially important in embodiments of the pool control system 200 that have multiple distribution valves 12, as shown in FIG. 10. The pausing arm 212 of the first distribution valve 12 can be engaged so that the first distribution valve 12 remains on a particular zone that corresponds with the second distribution valve 12, and then any changes made to the water flow and water pressure are applied to the second distribution valve 12, allowing the microcontroller 40 to fully control the position of the outlet port aperture 246 of the second distribution valve 12.

As disclosed in U.S. patent application Ser. No. 17/219,856 to Goettl, incorporated by reference above, the pool control system 200 may also comprise an interface 208 that is configured to receive specific feature input from a user for each of a plurality of specific features. These specific features may include a customized sequence for discharging water to each of the plurality of water zones 38, a customized duration of time for discharging water individually at each of the plurality of water zones 38, and/or a customized number of water cycles for a particular water zone 38 to receive prior to starting a water cycle in a subsequent water zone 38. Thus, the interface 208 allows the user to customize the performance of the pool control system 200. The interface 208 may be physically part of the pool control system 200 as a screen or other device adjacent to the pool or may be a phone app or a webpage accessed over the internet. The customized number of water cycles may be a different valve for each of at least two water zones 38 of the plurality of water zones 38. Similarly, the customized duration of time for discharging water at each of the plurality of water zones 38 may be a different duration of time for each of at least two water zones 38 of the plurality of water zones 38. In some embodiments of the pool control system 200, the microcontroller 40 is configured to receive input from the user and control the hydro-valve 106 and the pausing arm 212 to intelligently and selectively discharge water to each of the plurality of water zones 38 based on the input received through the interface 208. Thus, the pool control system 200 may be configured to communicatively couple with and be controllable over the internet.

The pool control system may be configured so that a pool can be programmed to have entirely different settings for each of: 1) a customized sequence for supplying water to the water zones, either in a sequential order or a different from sequential order selected by the user; 2) a customized duration of time for supplying water to each of the plurality of water zones, so that each zone can have its own duration different from the durations of the other zones controlled by the same controller; and 3) a customized number of water cycles for a particular water zone to receive prior to starting a water cycle in a subsequent water zone, so that a particular water zone could receive, for example, 10 cycles before moving to another zone that only receives, for example, one or two cycles, and every zone can have its own customized number of water cycles.

Within the pool cleaning system 10 illustrated in FIG. 11, the main logic for the cleaning controls remains within the controller valve 100, such as the systems and operations previously described in this system. The controller valve 100 may be configured to broadcast its own Wi-Fi signal and look for a home network Wi-Fi to connect to through the phone application described earlier. In this way, due to the main logic and wireless communication through a phone app, a pool can be programmed for its optimal operation through a simple interface on a phone. Based on the pool design, the installer can install the cleaning heads 16 of the appropriate type and orientation into the proper zones of the system. Using the installer's smart phone, the installer may open a portal in a phone app to communicate both with the controller valve main logic and with the optimal configuration for the cleaning system design. The installer can flash-install the optimal configuration programming from the app into the pool controller valve main logic to program the system 10. At any time thereafter, the installer or pool maintenance worker or the owner, with access to the app interface to the controller valve main logic, can make changes to any zone of the pool to change the number of cycles water is provided to the same zone before moving to a different zone, and change the duration water is provided under pressure to a particular zone during a particular cycle.

In addition to fluidly connecting the controller valve 100 to the distribution valve 12, an additional control wire 36 may be connected from the controller valve 100 to the distribution valve 12. As mentioned above, a distribution valve 12 as described in U.S. patent application Ser. No. 17/219,856 to Goettl et al., filed Mar. 31, 2021, titled "Intelligently Controlled Pool Cycling Valve" provides additional advantages working with the controller valve 100 as compared with conventional distribution valves, but all distribution valves are improved in working with the presently disclosed controller valve 100. The descriptions hereafter relate to the combination of the controller valve 100 with an intelligently controlled pool cycling valve such as the distribution valve 12.

Two significant advantages of an intelligently controlled pool cycling valve compared with a conventional distribution valve 12 are: first, that the valve moves from one port to the next port at the cessation of water flow through the valve, not the start; and second, that the valve can be paused on a single port (or zone) for multiple cycles and does not require the system to change to a different port each time the water stops and starts. In this way, the controller valve 100 can control when and for how long water is applied to the distribution valve 12. In some embodiments, a hardwired interlock to a third-party control system may provide the start/stop function or other functions commanded by the third-party control system. Additionally, the start/stop function may be activated by a flow switch, pressure switch, relay, or other similar device. Electronic signals can be sent to the distribution valve 12 through the control wire 36 to tell the distribution valve 12 when and for how many cycles to pause within a particular zone/port before changing to a new zone/port of the distribution valve 12. Fluid signals can be sent from the controller valve 100 to the distribution valve 12 through the controller valve 100 sending a portion of the water to the bypass water outlet 112 to drop the pressure applied to the distribution valve 12 to signal a cycle change for the particular zone being supplied with water by the distribution valve 12. In this way, the number of consecutive cycles for each cleaning zone, the duration of every cycle, and even the order of the cleaning zones can be completely controlled through the combined use of the controller valve 100 and an intelligently controlled pool cycling valve.

In particular configurations, some zones may be skipped by triggering two or more cycles one right after the other to cause the distribution valve 12 to shift to the next zone promptly after shifting to the previous zone. Cycles may be also triggered in quick succession if certain areas of a pool zone do not require cleaning or use less frequent cleaning. Regardless of the cleaning needs of the pool, the cycles, durations and orders can be intelligently controlled in a nearly unlimited combination of cleaning patterns by a combination of the controller valve 100 and one or more intelligently controlled multiport valves 12. In one particular configuration, it is contemplated that all of the cleaning cycles for a first zone of cleaning heads would be completed by pausing the distribution valve 12 on the first zone and cycling the cleaning heads 16 for appropriate durations by providing water flow and fluid cycle shift communications from the controller valve 100 to the distribution valve 12 on each cycle for the first zone prior to unpausing the distribution valve 12 to allow it to shift to the second zone and cycling through each of the cleaning cycles for the second zone of cleaning heads 16 for appropriate durations, and so on. In this way, the debris within the pool can be cleaned fully from areas of a pool farthest from the debris collection point(s) toward the debris collection point(s) of the pool in an efficient and organized manner.

By not stopping and starting the primary pool pump 14 and maintaining a continuous flow of water through the controller valve 100 despite reducing the system pressure by flowing water to the bypass water outlet 112 to trigger a cycle change, and by cleaning the pool in a more orderly and efficient manner, shorter cleaning pump operation times result, operating equipment lasts longer, significant energy savings is experienced, and the pool gets cleaner faster and for less money.

Although the description above provides examples of a controller valve 100 used in combination with a distribution valve 12, a distribution valve 12 is not a requirement. FIG. 10 illustrates an example of how the controller valve system 10 could be connected in-line with an existing swimming pool cleaning system 10 and a single zone of cleaning heads 16.

It will be understood that implementations of a controller valve are not limited to the specific assemblies, devices and components disclosed in this document, as virtually any assemblies, devices and components consistent with the intended operation of a controller valve may be used. Accordingly, for example, although particular controller valves, and other assemblies, devices and components are disclosed, such may include any shape, size, style, type, model, version, class, measurement, concentration, material, weight, quantity, and/or the like consistent with the intended operation of controller valves. Implementations are not limited to uses of any specific assemblies, devices and components; provided that the assemblies, devices and components selected are consistent with the intended operation of a controller valve.

Accordingly, the components defining any controller valve may be formed of any of many different types of materials or combinations thereof that can readily be formed into shaped objects provided that the materials selected are consistent with the intended operation of a controller valve. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various controller valves may be manufactured using conventional procedures as added to and improved upon through the procedures described here. Some components defining a controller valve may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling controller valves are not limited to the specific order of steps as disclosed in this document. Any steps or sequence of steps of the assembly of a controller valve indicated herein are given as examples of possible steps or sequence of steps and not as limitations, since various assembly processes and sequences of steps may be used to assemble controller valves.

The implementations of a controller valve described are by way of example or explanation and not by way of limitation. Rather, any description relating to the foregoing is for the exemplary purposes of this disclosure, and implementations may also be used with similar results for a variety of other applications employing a controller valve.

What is claimed is:

1. A pool control system, comprising:
   a controller valve having:
      a water inlet configured to fluidly couple with a water pump and receive water from a pool into the controller valve;
      a primary water outlet and a bypass water outlet each fluidly coupled to the water inlet and configured to pass water out of the controller valve; and
      a hydro-valve configured to move between an open position in which the water passes from the water inlet to the primary water outlet and a closed position in which the water passes from the water inlet to the bypass water outlet;
   a distribution valve having:
      an inlet port fluidly coupled to the primary water outlet of the controller valve;
      a plurality of outlet ports with an outlet port aperture configured to sequentially align with each of the plurality of outlet ports; and
      a pausing arm configured to move between a disengaged position in which the outlet port aperture is configured to align with a new outlet port of the plurality of outlet ports each time the hydro-valve moves from the open position to the closed position and an engaged position in which the pausing arm maintains a position of the outlet port aperture regardless of the position of the hydro-valve;
   a plurality of water zones each configured to fluidly couple with a respective outlet port of the plurality of outlet ports of the distribution valve;
   a microcontroller configured to intelligently and selectively discharge water from the pool control system to each of the plurality of water zones by controlling the hydro-valve to move the position of the hydro-valve between the open position and the closed position and controlling the pausing arm to move the position of the pausing arm between the disengaged position and the engaged position; and
   an interface configured to receive specific feature input from a user for each of a plurality of specific features including at least one of a customized sequence for discharging water to each of the plurality of water zones, a customized duration of time for discharging water individually at each of the plurality of water zones, and a customized number of water cycles for a particular water zone to receive prior to starting a water cycle in a subsequent water zone, wherein the customized number of water cycles is a different value for each of at least two water zones of the plurality of water zones.

2. The pool control system of claim 1, wherein the microcontroller is configured to receive the input from the user and to control the hydro-valve and the pausing arm to intelligently and selectively discharge water to each of the plurality of water zones based on the input received through the interface.

3. The pool control system of claim 1, wherein the pool control system is configured to communicatively couple with and be controllable over the internet.

4. The pool control system of claim 1, wherein the microcontroller is further configured to receive the specific feature input from the user for each of the plurality of water zones to program the pool control system.

5. A pool control system, comprising:
   a controller valve having a primary water outlet and a bypass water outlet, wherein the controller valve is configured to move between an open configuration in which the water passes from a water inlet to the primary water outlet and a closed configuration in which the water passes from the water inlet to the bypass water outlet;
   a distribution valve having:
      an inlet port fluidly coupled to the primary water outlet of the controller valve; and
      a plurality of outlet ports with an outlet port aperture configured to sequentially align with each of the plurality of outlet ports;
      wherein the outlet port aperture is configured to align with a new outlet port of the plurality of outlet ports each time the controller valve moves from the open configuration to the closed configuration;
   a plurality of water zones each configured to fluidly couple with a respective outlet port of the plurality of outlet ports of the distribution valve; and
   a microcontroller configured to intelligently and selectively discharge water from the pool control system to each of the plurality of water zones by controlling the controller valve to change the configuration of the controller valve between the open configuration and the closed configuration; and
   an interface configured to receive specific feature input from a user for each of a plurality of specific features of the pool control system including at least one of a customized sequence for discharging water to each of the plurality of water zones, a customized duration of time for each of the respective plurality of water zones for discharging water individually at each of the respective plurality of water zones, and a customized number of water cycles for a particular water zone to receive prior to starting a water cycle in a subsequent water zone, wherein the customized number of water cycles is a different value for each of at least two water zones of the plurality of water zones.

6. The pool control system of claim 5, wherein the controller valve has a water inlet configured to fluidly couple with a water pump and receive water from a pool into the controller valve.

7. The pool control system of claim 5, the distribution valve further having a pausing arm configured to move between a disengaged position in which the outlet port aperture is configured to align with a new outlet port of the plurality of outlet ports each time the controller valve moves from the open configuration to the close configuration and an engaged position in which the pausing arm maintains a position of the outlet port aperture regardless of the configuration of the controller valve.

8. The pool control system of claim 7, wherein the microcontroller is configured to control the pausing arm to move the position of the pausing arm between the disengaged position and the engaged position and pause the distribution valve at a selected outlet port of the plurality of outlet ports so long as the pausing arm is in the engaged position.

9. The pool control system of claim 5, wherein the microcontroller is configured to receive the input from the user and to control the controller valve to intelligently and selectively discharge water to each of the plurality of water zones based on the input received from the interface.

10. The pool control system of claim 5, wherein the pool control system is configured to communicatively couple with and be controllable over the internet.

11. The pool control system of claim 5, wherein the microcontroller is further configured to receive the specific feature input from the user for each of the plurality of water zones to program the pool control system.

12. A pool control system, comprising:
a controller valve configured to selectively pass water to a primary water outlet of the controller valve;
a distribution valve fluidly coupled to the primary water outlet of the controller valve and configured to individually select each of a plurality of outlet ports of the distribution valve and select a new outlet port each time the controller valve begins passing water to the primary water outlet;
a plurality of water zones each configured to fluidly couple with a respective outlet port of the plurality of outlet ports of the distribution valve;
a microcontroller configured to intelligently and selectively discharge water to each of the plurality of water zones by controlling the controller valve; and
an interface configured to receive specific feature input from a user for each of a plurality of specific features of the pool control system including at least two of a customized sequence for discharging water to each of the plurality of water zones, a customized duration of time for each of the plurality of water zones for discharging water individually at each of the plurality of water zones, and a customized number of water cycles for a particular water zone to receive water prior to starting a water cycle in a subsequent water zone.

13. The pool control system of claim 12, wherein the microcontroller is configured to receive the specific feature input from the user for each of the plurality of water zones to program the pool control system.

14. The pool control system of claim 13, wherein the distribution valve has an outlet port aperture configured to align with a new outlet port of the plurality of outlet ports each time the controller valve moves from the open configuration to the closed configuration.

15. The pool control system of claim 14, the distribution valve having a pausing arm configured to move between a disengaged position in which the outlet port aperture is configured to align with a new outlet port of the plurality of outlet ports each time the controller valve moves from the open configuration to the close configuration and an engaged position in which the pausing arm maintains a position of the outlet port aperture regardless of the configuration of the controller valve, wherein the microcontroller is configured to control the pausing arm to move the position of the pausing arm between the disengaged position and the engaged position.

16. The pool control system of claim 12, wherein the microcontroller is configured to receive the input from the user and to control the controller valve to intelligently and selectively discharge water to each of the plurality of water zones based on the input received through the interface.

17. The pool control system of claim 12, wherein the customized number of water cycles is a different value for each of at least two water zones of the plurality of water zones.

18. The pool control system of claim 12, wherein the pool control system is configured to communicatively couple with and be controllable over the internet.

19. The pool control system of claim 12, wherein the controller valve has a water inlet configured to fluidly couple with a water pump and receive water from a pool into the controller valve.

20. The pool control system of claim 12, wherein the microcontroller is configured to receive the input from the user and to control the distribution valve and a pausing arm to intelligently and selectively discharge water to each of the plurality of water zones based on the input received through the interface.

* * * * *